US010466029B2

(12) United States Patent
Fuchs et al.

(10) Patent No.: US 10,466,029 B2
(45) Date of Patent: Nov. 5, 2019

(54) METHOD FOR CORRECTING AN ANGULAR DEVIATION IN THE OPERATION OF A COORDINATE MEASURING MACHINE

(71) Applicant: CARL ZEISS INDUSTRIELLE MESSTECHNIK GMBH, Oberkochen (DE)

(72) Inventors: Andreas Fuchs, Rainau (DE); Tobias Held, Noerdlingen (DE); Rainer Sagemueller, Aalen (DE); Dominik Seitz, Schwaebisch Gmuend (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 214 days.

(21) Appl. No.: 14/773,457

(22) PCT Filed: Mar. 13, 2014

(86) PCT No.: PCT/EP2014/054978
§ 371 (c)(1),
(2) Date: Sep. 8, 2015

(87) PCT Pub. No.: WO2014/140188
PCT Pub. Date: Sep. 18, 2014

(65) Prior Publication Data
US 2016/0018207 A1 Jan. 21, 2016

(30) Foreign Application Priority Data
Mar. 15, 2013 (DE) .......................... 10 2013 204 581

(51) Int. Cl.
*G01B 5/004* (2006.01)
*G01B 21/04* (2006.01)
*G01B 5/00* (2006.01)

(52) U.S. Cl.
CPC ............ *G01B 5/004* (2013.01); *G01B 5/0014* (2013.01); *G01B 5/0016* (2013.01); *G01B 21/045* (2013.01)

(58) Field of Classification Search
CPC . G01B 5/004; G01B 5/14; G01B 5/16; G01B 21/045; G01B 21/04; G01B 21/042; G01B 5/008; G01B 5/25
(Continued)

(56) References Cited
U.S. PATENT DOCUMENTS 8,229,694 B2   7/2012   Nakagawa et al.
2005/0016008 A1*  1/2005   Raab .................... B23Q 35/04
                                                   33/503

(Continued)

FOREIGN PATENT DOCUMENTS

CN   1651858 A   8/2005
CN   1892175 A   1/2007
(Continued)

OTHER PUBLICATIONS

English Machine Translation of EP Patent Application No. EP1764579.*
(Continued)

Primary Examiner — Dzung Tran
(74) Attorney, Agent, or Firm — Laurence A. Greenberg; Werner H. Stemer; Ralph E. Locher

(57) ABSTRACT

A method for correcting an angular deviation between a real angle and an ideal angle between motion axes of a coordinate measuring device. The angular deviation depends on position, temperature, and/or loading mass. Values of a position-dependent angular deviation for partial measurement ranges of the coordinate measuring device are determined, and/or a difference between the angular deviation in a partial measurement range and a total measurement range, and the position-dependent angular deviation is corrected by (Continued)

using these values. Values of the temperature-dependent angular deviation for at least two different temperatures are determined and the deviation is corrected based on these. Values of the loading-mass-dependent angular deviation for loading the coordinate measuring device with at least two different loading masses are determined in a range of loading masses and/or information is obtained for correcting the loading-mass-dependent angular deviation in a temperature range and the deviation is corrected by using one of the values or information.

24 Claims, 6 Drawing Sheets

(58) Field of Classification Search
  USPC .................................................. 702/95, 150
  See application file for complete search history.

(56) References Cited

U.S. PATENT DOCUMENTS

| | | |
|---|---|---|
| 2005/0166412 A1 | 8/2005 | Ogura et al. |
| 2006/0123649 A1* | 6/2006 | Muller .................. G01B 7/012 |
| | | 33/559 |
| 2007/0010959 A1 | 1/2007 | Chang et al. |
| 2007/0163134 A1* | 7/2007 | Eaton ..................... G01B 5/004 |
| | | 33/502 |
| 2009/0187373 A1* | 7/2009 | Atwell .................. B25J 9/1692 |
| | | 702/152 |
| 2012/0262700 A1* | 10/2012 | Schumann .............. G01S 17/89 |
| | | 356/4.01 |

FOREIGN PATENT DOCUMENTS

| | | |
|---|---|---|
| CN | 101769704 A | 7/2010 |
| DE | 10122080 A1 | 11/2002 |
| DE | 102004003864 A1 | 8/2005 |
| DE | 102005023467 A1 | 11/2006 |
| DE | 102008006927 A1 | 7/2009 |
| DE | 102008058198 A1 | 5/2010 |
| DE | 102010056039 A1 | 6/2012 |
| EP | 1764579 A1 | 3/2007 |
| EP | 1393012 B1 | 2/2011 |
| JP | 2009271030 A | 11/2009 |
| JP | 2012093236 A | 5/2012 |
| WO | 02090879 A2 | 11/2002 |

OTHER PUBLICATIONS

Pressel, Hans-Gerd, "Genau messen mit Koordinatedmessgeraeten" 1997, pp. 1434-1439, expert Verlag.

Zhao Wenle, "Theoretical Analyses and Experimental Study on the Dynamic Compensation for Thermal Error of CMMs", Journal of China Institute of Metrology No. 1 (Sum No. 7), pp. 51-58, Jun. 1994—English abstract on p. 58.

* cited by examiner

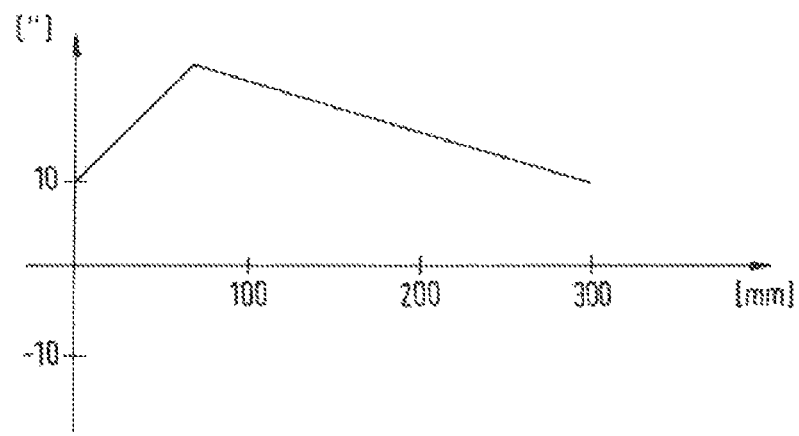
FIG. 8
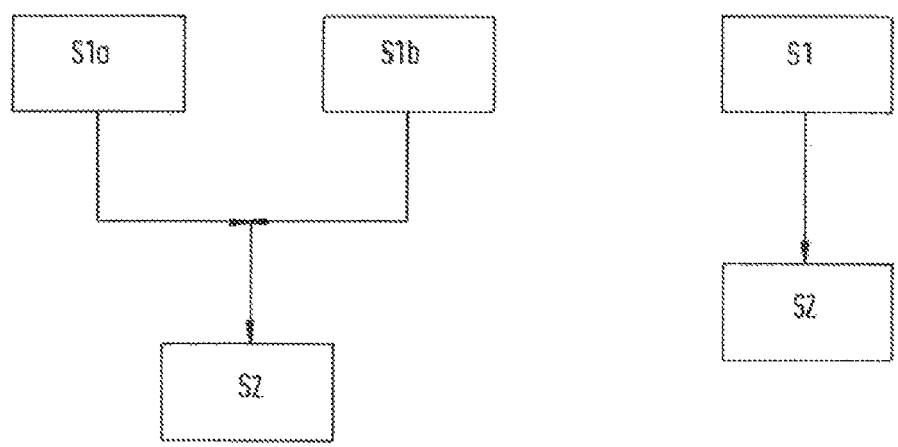
FIG. 9A
FIG. 9B

METHOD FOR CORRECTING AN ANGULAR DEVIATION IN THE OPERATION OF A COORDINATE MEASURING MACHINE

BACKGROUND OF THE INVENTION

Field of the Invention

The present invention relates to a method for correcting angular deviations in the operation of a coordinate measuring machine which are governed by various influences, and to a coordinate measuring machine designed for carrying out this method.

Coordinate measuring machines (CMM) are known whose movable parts have different, mutually perpendicular linear degrees of freedom of movement. In particular, said movable parts serve to move at least one measuring device (for example one or a plurality of sensors and/or probes) of the CMM, wherein the measuring device serves to measure the coordinates of measurement objects, in particular of a workpiece. Ideally, the corresponding guides for guiding the movements are configured such that the movable parts of the CMM can be moved exactly perpendicularly relative to one another. By way of example, the sleeve of a CMM of gantry design, wherein a measuring head is fixed to the sleeve, is intended to be movable exactly perpendicularly to the likewise movable slide of the gantry. In practice, however, the guides are not ideal, as a result of which the following geometrical deviations arise: translational guidance deviations, rotational guidance deviations and angular deviations.

A translational guidance deviation is the parallel offset (without tilting) of the guided element transversely with respect to the displacement direction. However, translational errors occur not only transversely with respect to the displacement direction, but also in the displacement direction. In this case, these translational errors are also designated as position errors. A rotational guidance deviation is the tilting of the guided element about the three axes of a Cartesian coordinate system. An angular deviation is the deviation of the angle between the linear movements guided by two different guides (for example along two travel axes for the measuring head of a CMM or along the travel axis of the sleeve and the travel axis of the gantry slide) from the predefined angle. The terms travel axis and movement axis are used synonymously.

In many CMMs, the directions of the different rectilinear degrees of freedom of movement are ideally at right angles to one another and run along the axes of a Cartesian coordinate system. In this case, the angular deviation is referred to as a perpendicularity deviation. A perpendicularity deviation of the CMM is therefore the deviation of the angle between in each case the axes of two rectilinear degrees of freedom of movement from the desired angle of 90°. Axial arrangements with other desired angles are also possible, in principle. Perpendicularity deviations and their effects are described in the book "Genau messen mit Koordinatenmessgeräten" ["Accurate measurement with coordinate measuring machines"] by Hans-Gerd Pressel (expert Verlag; ISBN 3-8169-1434-9), pages 23-28.

Values for three translational guidance deviations and three rotational guidance deviations can be specified for each movement axis. In the case of a CMM having three movement axes (X, Y and Z), which in the ideal case form the axes of a Cartesian coordinate system, a total of 18 guidance deviation values or parameters therefore describe the deviations from the ideal case. If the 18 guidance deviation values are related to the real axes rather than to a Cartesian coordinate system, three values of the perpendicularity deviations between the axes are also added in order to describe the guidance errors.

Besides CMMs having three Cartesian axes, CMMs having a rotary table are often used as well, the rotation axis of which rotary table can be referred to as a fourth axis. A rotary table is also understood to mean a rotary apparatus with which a measurement object, unlike in the case of a table, is not merely emplaced, but rather is combined with the rotary apparatus in some other way. The requirements made of the accuracy of such four-axis coordinate measuring machines increase. In the case of rotary tables, the maximum permissible deviations ($MPE_{FR}$, $MPE_{FT}$, $MPE_{FA}$) defined according to the ISO 10360 standard are specified with increasingly smaller tolerances. $MPE_{FR}$ denotes the maximum permissible radial deviation. $MPE_{FT}$ denotes the maximum permissible tangential deviation. $MPE_{FA}$ denotes the maximum permissible axial deviation, while the actual deviation is designated by FR, FT, FA.

Particularly if a rotary table is calibrated using the measuring systems of the CMM or its movement behavior is measured, the deviations with regard to the movement axes of the CMM (X-, Y-, Z-axes) are also responsible for the deviations FR, FT, FA with regard to the rotation axis of the rotary table. It has been found that a large proportion of the deviations with regard to the rotation axis are governed by angular deviations, in particular perpendicularity deviations of the movement axes of the CMM. In the case of a rotary table, the angular deviations cause, in particular, undesirably high radial deviations (FR), tangential deviations (FT) and axial deviations (FA).

BRIEF SUMMARY OF THE INVENTION

It is an object of the present invention to reduce the effects of angular deviations of the axes of linear degrees of freedom of movement of a CMM on measurement results of the CMM, particularly when using a rotary apparatus.

The invention is based on the insight that the angular deviation is variable, namely is location-dependent, and/or temperature-dependent and/or loading mass-dependent. It is therefore proposed to determine the variable angular deviation and use it for correction purposes. In this case, the correction can be carried out before, during and/or after the measurement of coordinates ("coordinate measurement") of a workpiece by the CMM.

In particular, it is possible to carry out the correction, for example continuously, repeatedly or as necessary, during or after the movement of at least one of the movable parts of the CMM, e.g. by values of the instantaneous positions of the movable parts of the CMM being corrected depending on the location, on a temperature during the measurement and/or on a mass effective during the measurement.

The location is, for example, the location of a measuring head, in particular of a probe, or of a sensor for determining the coordinates of a workpiece, or the location of some other movable part of the CMM. If the movable part of the CMM is a probe or sensor for determining the coordinates of a workpiece, the movable part is situated in particular in the measurement region of the CMM and thus also in a specific partial measurement region. If said movable part is a probing element of a tactile probe for the tactile probing of the surface of a workpiece, for the purpose of determining the coordinates thereof, the probing element is situated in the same partial measurement region of the CMM as the workpiece during the probing of the workpiece. However, consideration should be given to ensuring that the effects on the angular deviation are taken into account in the event of the probe being exchanged for a different probe having different dimensions or a different mass. In particular, exchanging a first probe for a second probe having a different probe pin length or different probe pin alignment has the effect that other movable parts of the CMM are situated at a different location in relation to at least one movement axis of the CMM if a workpiece is intended to be probed at the same point of its surface. This should be taken into account in the location dependence of the angular deviation.

The partial measurement region is, in particular, a continuous linear region (for example along one travel axis of the CMM), a continuous planar region (for example defined by two travel axes of the CMM) or a continuous volume region (for example defined by three travel axes of the CMM). By way of example, the partial measurement region corresponds in the case of a linear region to a part, i.e. to a section, of one movement axis of the coordinate measuring machine, or in the case of a planar region to parts, i.e. sections, of two movement axes of the coordinate measuring machine, and in the case of a volume region to parts, i.e. sections, of three or more movement axes of the coordinate measuring machine. To put it another way, the partial measurement region can be formed in each case by a section of one travel axis, or by sections of two travel axes, or by sections of three or more travel axes. A CMM can have up to n movement axes and all or a portion of the movement axes, at least three, can be used for defining a volume region. The angular deviation is an angular deviation in the relevant section of the movement axis relative to a further movement axis. The location in which a workpiece or a probe or sensor for determining the coordinates of the workpiece is situated need not be conjugate with such a partial measurement region in this case. A deviation from the partial measurement region can arise for example as a result of a specific probe length and/or probe alignment. The type, configuration and geometry of the measuring head, probe or sensor have an effect on the position of the partial measurement region, which is related to axis sections, even when the position of the workpiece is unchanged. That is to say that in the event of a change in the sensor, the axis-related partial measurement region can be changed, which should be taken into account in the method according to the invention for correcting the location-dependent angular deviation.

The correction of the angular deviation can be carried out, for example, by one of the two movement axes to which the angular deviation relates being regarded as a reference axis located correctly in the coordinate system of the coordinate measuring machine. The alignment of the other of the two movement axes can then be corrected by correction of the angle between the two movement axis in accordance with the angular deviation. This can be achieved for example by means of a coordinate transformation known per se.

In addition to the correction of the angular deviation, in particular translational and rotational errors of at least one movement axis of the CMM can be corrected. It has already been mentioned above that these errors describe the deviations of movable parts of the CMM along the movement axes from the rectilinear ideal movement. Like the correction of the angular deviation as well, the correction of these errors can be carried out, for example continuously, repeatedly or as necessary, during or after the movement of the at least one movable part of the CMM.

Preferably, the value of the angular deviation that is to be used for the correction is determined only if the different movable parts of the CMM, relative to the movement axes of the CMM, have in each case reached a location for which the correction is intended to be performed. In the case of Cartesian movement axes effective in a cascading manner with respect to one another, as is the case for example for a CMM of gantry design, the overall movement state of the CMM (which is defined by the locations of the different movable parts of the CMM relative to the movement axes of the CMM) is uniquely determined by the location at which the parts that are movable in relation to the last movement axis in the cascade are situated. In the case of a CMM of gantry design, said last movement axis in the cascade is the movement axis which is usually designated as the Z-axis and along which the sleeve carrying the sensor or measuring head is movable. Therefore, the value of the angular deviation that is to be used for the correction is determined in particular depending on the location at which a part (for example a sensor or probe) of the CMM that is movable along said movement axis is situated.

This procedure when determining the value of the angular deviation that is to be used for the correction has the advantage that the dependence on the angular deviation of at least one further variable (the temperature and/or loading mass) can also be taken into account in a simple manner. After the movement state in which the correction is to be carried out has been attained, the values of the variables on which the angular deviation is dependent can be determined in a simple manner and the instantaneously valid value of the angular deviation can be determined taking account of the previously determined behavior of the angular deviation in a manner dependent on the variables.

This concept also makes it possible to store the information required for determining the instantaneously valid value of the angular deviation (which information was obtained by the determination of the behavior of the angular deviation depending on the variables) in a simple manner, for example in the form of data tables which are stored separately from the information about further guidance deviations, for example the rotational errors of the movement axes.

By contrast, if only the location dependence of the angular deviation is taken into account and corrected, it is also possible to store the angular deviation jointly with the information about the rotational errors of the movement axes. By way of example, the respective rotational error can be corrected in a location-dependent manner by an offset value corresponding to the angular deviation valid at the respective location. These corrected values of the rotational errors can then be stored in order to be able to use them later for a correction of all errors of the movement axes.

What is specified, in particular, is a method for correcting at least one angular deviation of a real angle from an ideal angle between movement axes with a coordinate measuring machine, wherein the angular deviation is location-dependent, temperature-dependent and/or dependent on a loading mass, comprising the steps of a-1) determining values of the location-dependent angular deviation in such a way that
  i) in each case at least one value is determined for at least two partial measurement regions of the coordinate measuring machine which form only part of a total measurement region of the coordinate measuring machine, wherein values of the location-dependent angular deviation determined for different partial measurement regions of the coordinate measuring machine differ or can differ, and/or
  ii) at least one value is determined for at least one partial measurement region and at least one value of the angular deviation is determined for a total measurement region of the coordinate measuring machine, wherein the at least one determined value for a partial measurement region of the coordinate measuring machine differs or can differ from the at least one value for the total measurement region, and b-1) correcting the location-dependent angular deviation in one or a plurality of partial measurement regions of the coordinate measuring machine for which at least one value was determined, using the at least one determined value of the location-dependent angular deviation, and/or the steps of a-2) determining values of the temperature-dependent angular deviation for at least two different temperatures in such a way that values of the temperature-dependent angular deviation in a temperature range are determined and/or information for correcting the temperature-dependent angular deviation in a temperature range is obtained, b-2) correcting the temperature-dependent angular deviation using one of the determined values and/or obtained information from step a-2, and/or the steps of a-3) determining one value or a plurality of values of the loading mass-dependent angular deviation upon the loading of the coordinate measuring machine with one loading mass or with at least two different loading masses in such a way that a value for the loading mass-dependent angular deviation or values of the loading mass-dependent angular deviation in a range of loading masses is or are determined and/or information for correcting the loading mass-dependent angular deviation is obtained, and b-3) correcting the loading mass-dependent angular deviation using one of the determined values and/or the obtained information from step a-3).

The proposed method mentions "at least one angular deviation". An angular deviation exists in each case in relation to the two ideally rectilinearly movement axes of a CMM, for example the X- and Y-axes. Therefore, three such angular deviations can be determined in the case of a CMM having three ideally rectilinear movement axes. In particular, the proposed method can therefore be carried out for a plurality of angular deviations, in particular three angular deviations, in the same way as for one angular deviation.

In particular, on the basis of the corrected angular deviation(s), the measurement of coordinates of a workpiece by the CMM can be carried out more accurately (made more precise) since, in particular, the position of a sensor and/or probe of the CMM for measuring the coordinates of the workpiece after the correction is known more accurately as a result of the correction. Preferably, therefore, the method also includes the optional step of measuring coordinates of a workpiece.

Angular deviations, i.e. errors, that are location-dependent, temperature-dependent and/or governed by mass influences can be corrected by the method. The method can be employed either only for correcting a location-dependent angular error, or only for correcting a temperature-dependent angular error or only for correcting an angular error governed by mass influences, or an arbitrary possible combination of these influences can be taken into account. At least steps a-1) and b-1) are performed when correcting a location-dependent angular error, at least steps a-2) and b-2) are performed when correcting a temperature-dependent angular error, and at least steps a-3) and b-3) are performed when correcting an angular error governed by mass influences. Further subcombinations of method steps are a-1) and b-1) and a-2) and b-2)
a-1) and b-1) and a-3) and b-3)
a-2) and b-2) and a-3) and b-3)

In particular, it is possible to carry out the correction in steps b-1), b-2) and/or b-3) continuously, repeatedly or as necessary, during or after the movement of at least one of the movable parts of the CMM, for example of a probe or of a sensor, e.g. by values of the instantaneous positions of the movable parts of the CMM being corrected depending on the location, on a temperature during the measurement and/or on a mass effective during the measurement. By means of the method, an angular deviation is corrected and the position of the movable part is corrected with this information. Further corrections such as a correction of the translational and/or rotational guidance deviations mentioned in the introduction, can be added. In particular, the correction can be carried out during the measurement operation of a CMM, during the measurement of a workpiece, which holds true for all method variants described and claimed. Values of the instantaneous positions of the movable parts of the CMM, in particular of a probe or of a sensor, can thus be corrected during measurement operation.

The invention generally relates to the correction of angular deviations or angular errors, as described above. The invention specifically relates to the correction of perpendicularity deviations or perpendicularity errors. When mention is made of "perpendicularity deviation" or "perpendicularity error" hereinafter for the sake of simplicity, this always also includes the general case of the "angular deviation" or the "angular error", unless indicated otherwise.

By means of the method, specifically, a perpendicularity deviation is determined in a location-dependent manner, in a temperature-dependent manner and/or in a loading mass-dependent manner. The term "correction of the perpendicularity deviation" is also shortened to "perpendicularity correction".

The correction can be carried out directly or indirectly, alone or with other values. When a value is used, the value can be used for example directly for a computational correction. When the correction is carried out indirectly, a value can be used for example for predictions, in particular for determining a difference between angular deviations, as also described further below. Values of the angular deviation can be used alone or in addition to the other deviation values, for example rotational and/or translational guidance deviations of the CMM, for correction purposes.

The term "determining" describes generally a recognition process, specifically the process of obtaining the recognition of the magnitude of an angular deviation. Determining can be for example visual reading and/or machine reading. Furthermore, the determining process can be automated, without the need for checking or separate attention on the part of a human being. The determining process can be a measuring process or it can comprise one or a plurality of measuring processes, for example by means of a determining system or a measuring system. The determining process can comprise one or a plurality of calculations, for example if an error is intended to be determined with the aid of previously determined variables, or can comprise other kinds of mathematical operations, such as e.g. finding a functional relationship between the angular deviation and an influencing variable, or an interpolation or an extrapolation. Calculations can be carried out by means of a computing apparatus.

In particular, determining the angular deviation can involve carrying out a measurement and/or calculation of the angular deviation, as known per se from the prior art.

Alternatively or additionally, from information about the angular deviation (the information can be obtained in particular by means of the determining and/or calculation) for different partial measurement regions, different temperatures and/or different loading mass, it is additionally possible to determine how the angular deviation varies in the measurement region of the coordinate measuring machine, in a temperature range and/or in the range of possible loading masses. By way of example, it is possible to determine a model which describes the angular deviation in a manner dependent on the location, the temperature and/or the loading mass.

A correction is preferably carried out in such a way that determined deviations are corrected computationally, preferably by the controller of a CMM. A computational correction is also referred to as CAA (computer aided accuracy), which is represented for example by a mathematical model implemented in the controller system. Data of the CAA can be stored in the controller of a CMM, for example in a computer-readable file. In particular, CAA corrections can be computed in real time, i.e. during a measuring process. Values of the angular deviation determined in the method can be used for a computational correction. Such a computational correction can can be carried out analogously to a computational correction of angular deviations or other guidance deviations that is already known per se, for example by means of CAA methods known per se.

The term "at least one value" or "at least one determined value" can mean the following: one value is meant, either the angular deviation between the X- and Y-axes (in particular the perpendicularity deviation xWy), or the angular deviation between the X- and Z-axes (in particular the perpendicularity deviation xWz), or the angular deviation between the Y- and Z-axes (in particular the perpendicularity deviation yWz). Alternatively, two values from the above-mentioned angular deviations are meant, or all three.

Individual aspects of the correction of the location-dependent angular deviation, of the temperature-dependent angular deviation and of the angular deviation dependent on the loading mass are discussed below.

Correction of the Location-Dependent Angular Deviation

A location-dependent angular deviation means, for example, that the angular deviation in one partial measurement region is different than the angular deviation in another partial measurement region. A location denotes a partial measurement region, in particular. However, the method can also encompass the case where the angular deviation is identical in different partial measurement regions. It is therefore possible that values of the location-dependent angular deviation determined for different partial measurement regions of the coordinate measuring machine differ or do not differ, wherein the possibility that angular deviations do not differ is expressed by the formulation "can differ". However, the angular deviation generally changes from location to location within the total measurement region of the CMM and thus from partial measurement region to partial measurement region.

The method can also encompass the case where the angular deviation is identical in a partial measurement region and in a total measurement region. It is therefore possible that a determined value for a partial measurement region of the coordinate measuring machine differs or can differ from a value for the total measurement region, wherein the last-mentioned can case encompasses the possibility that the not angular deviation do not differ. However, the angular deviation generally changes when the total measurement region is compared with a partial measurement region.

The term "local angular deviation" used in this description of the invention corresponds to an angular deviation in a partial measurement region and is tantamount to an angular deviation valid only locally, namely in the partial measurement region.

A "partial measurement region" is a locally delimited measurement region that is part of an overall available total measurement region of a CMM. Each partial measurement region is smaller than the total measurement region. In particular, the total measurement region is a continuous linear region (for example along one travel axis of the CMM), a continuous planar region (for example defined by two travel axes of the CMM) or a continuous volume region (for example defined by three travel axes of the CMM). In particular, the partial measurement region is a continuous linear region (for example along one travel axis of the CMM), a continuous planar region (for example defined by two travel axes of the CMM) or a continuous volume region (for example defined by three travel axes of the CMM), wherein the partial measurement region is smaller than the total measurement region.

In principle, angular deviations in different partial measurement regions can be taken into account by means of the method. In particular, the angular deviation can be determined by being measured in the different partial regions and/or described by a computational model.

The method can be carried out such that the local angular deviation is taken into account computationally only if measurement is carried out in the relevant section of the axis. By way of example, the CAA data set containing the information concerning the local angular deviations can be used for computational correction if measurement is carried out in the relevant partial measurement region.

The method preferably involves the use of a controller designed to automatically take account of the angular deviations of the relevant partial measurement region if measurement is carried out in the relevant measurement region of the CMM. The controller is then preferably designed such that a local angular deviation automatically is disregarded or remains deactivated as long as measurement is not carried out in the relevant, assigned partial region. When taking into account automatically, it is preferred to smooth transitions between angular deviation values of different measurement regions. If a CMM controller switches for example from an angular deviation value in one partial measurement region to an angular deviation value in another, e.g. adjacent, partial measurement region and the transition between the values is abrupt, then the transition is preferably smoothed, for example with additional interpolation points for the angular deviation values in the transition region, or with the aid of splines or polynomials, as a result of which instances of incorrect control of the closed-loop control circuit can be avoided.

A further configuration provides for the user to stipulate that measurement is carried out in a particular region or a partial measurement region. The locally valid angular deviation is then taken into account in the correction at the instigation of the user.

The partial measurement regions can be measurement regions which complement one another to form a superordinate, larger measurement region, for example to form the total measurement region of the CMM. The partial measurement regions can be adjacent to one another, partly overlap, or interruptions between partial measurement regions can be present. One (larger) partial measurement region can also enclose another, smaller partial measurement region. In the latter case, in the larger partial measurement region a different location-dependent angular deviation than in the smaller partial measurement region encompassed by the larger preferably applies. In order to determine the angular deviation in the larger partial measurement region, angular deviations can be determined at a plurality of places within the larger partial measurement region and averaged, or an angular deviations can be determined in a partial region of the larger partial measurement region, preferably in the center of the larger partial measurement region, and taken as a basis as angular deviation for the larger partial measurement region.

By way of example, the partial measurement region corresponds in the case of a linear region to a part, i.e. to a section, of one movement axis of the coordinate measuring machine, or in the case of a planar region to parts, i.e. sections, of two movement axes of the coordinate measuring machine, and in the case of a volume region to parts, i.e. sections, of three or more movement axes of the coordinate measuring machine. A CMM can have up to n movement axes and all or a portion of the movement axes, but at least three, can be used for defining a volume region. If the respective part of the CMM that is movable along the movement axis (travel axis) of the CMM is situated in the section and if a coordinate measurement of a workpiece is carried out at this point in time or in this period of time, the workpiece is situated in the corresponding partial measurement region. The perpendicularity deviation in a section of a (first) travel axis is related to a further (second) axis that is at an angle with respect to the first axis.

In particular as a result of translational and/or rotational guidance errors that occur only locally, in sections of one movement axis, perpendicularity deviations in relation to other movement axes arise in the sections. This is a reason for the location dependence.

Generally, as mentioned above, translational and rotational errors occur during the movement of movable parts of a CMM along a movement axis. Even after a computational correction of these translational and rotational guidance deviations which is preferably carried out, specifically before the coordinate measurement of workpieces, small translational and rotational residual errors which cause a location-dependent perpendicularity deviation are still present.

A travel axis corresponds to a displacement axis or a guideway along which e.g. the measuring head or sensor of the CMM or a gantry or a slide of a CMM is displaced or moved. The travel axes or displacement axes of the CMM are also referred to as X-, Y- or Z-axis of the CMM in the case of a Cartesian coordinate system. The angular deviation can be different in different sections of a travel axis (i.e. if the part of the CMM that is movable along the travel axis is situated in the respective section). An angular deviation related to a section is a local angular deviation that is valid within this section with reference to a further travel axis. In principle, different angular deviations in different sections can be taken into account by means of the method.

In one embodiment, the angular deviation in the section of the movement axis of the coordinate measuring machine together with a rotational guidance deviation of a real movement of parts of the coordinate measuring machine along the movement axes from an ideal movement of the parts of the coordinate measuring machine along the movement axis is taken into account. This is done by the formation of a correction function for correcting the angular deviation and the rotational guidance deviation. The correction function is formed from values of the angular deviation in the at least one partial measurement region and values of the rotational guidance deviation. The values of the rotational guidance deviation preferably extend over a longer section of the axis than the partial measurement region, for example over the entire axis. Such a correction function, also referred to as "correction data set", can be formed by summation of the local angular deviation with a rotational guidance deviation.

The influence of local angular deviations can be described by local offsets in the correction lines for describing the rotational movement errors. In this respect, reference is made to the exemplary embodiments. In adjacent sections of a travel axis, the offset in a correction line for describing the rotational movement errors changes if the angular deviation changes. Discontinuities that arise as a result of a stepped change in the offset can be smoothed by customary methods (e.g. splines or polynomials). The continuity of the transitions is preferred for processing by the closed-loop circuit of the measuring machine.

The above-described method for correcting the location-dependent angular deviation can be applied to a plurality of sections of travel axes and/or to different travel axes. Preferably, the local angular deviations in a partial measurement region above a rotary table are taken into account, as also described below. The partial measurement region above a rotary table can be a measurement volume above the rotary table and can be mapped by sections of the travel axes.

In the abovementioned variant a-1) ii) of the method at least one value of the angular deviation is determined for a total measurement region of the coordinate measuring machine, wherein the at least one determined value for a partial measurement region of the coordinate measuring machine differs or can differ from the at least one value for the total measurement region. The total measurement region of the coordinate measuring machine includes at least one partial measurement region. The partial measurement region is therefore contained as a subregion in the total measurement region, and the term "total measurement region" denotes a larger measurement region in comparison with a partial measurement region. The total measurement region of the CMM describes the total space accessible for coordinate measurements with this CMM. In this context, the total measurement region is also referred to as "global measurement region". The partial measurement region is also referred to as "local measurement region".

What is specified in one specific embodiment is a method for correcting a local angular deviation in the operation of a coordinate measuring machine (CMM), comprising the steps of
 determining at least one value of the location-dependent angular deviation for at least one partial measurement region,
 determining at least one value of the angular deviation of the total measurement region,
 correcting the location-dependent angular deviation in one or a plurality of partial measurement regions of the coordinate measuring machine if a coordinate measurement is carried out in the partial measurement region, wherein the at least one value of the angular deviation in the relevant partial measurement region is used during the correction, and optionally
 correcting the angular deviation in the total measurement region if a coordinate measurement is carried out in the total measurement region and outside the partial measurement region, wherein the at least one value of the angular deviation in the total measurement region is used during the correction.

The angular deviation in the total measurement region can be obtained by the formation of an average value from a plurality of angular deviations, as also described by way of example. Since the travel or displacement axes are intrinsically not exactly straight, other angular deviations between the axes arise locally or in sections. Furthermore, translational guidance errors that occur only locally, in sections of a movement axis can give rise to different perpendicularity deviations in sections. In order to determine the angular deviation in the total measurement region, preferably the angular deviation is determined at a plurality of places within the total measurement region and averaged, or an angular deviation is determined in a partial region of the total measurement region, preferably in the center of the total measurement region, and taken as a basis as angular deviation for the total measurement region.

A local correction for a partial measurement region can be carried out in various ways with inclusion of the angular deviation in the partial measurement region and the angular deviation in the total measurement region.

In one variant, when correcting the location-dependent angular deviation in a partial measurement region, a difference between the at least one value of the angular deviation for the total measurement region and the at least one value of the angular deviation for the partial measurement region is determined, and the difference is used when correcting the angular deviation. Therefore, a method is specified wherein, when using the value(s) of the perpendicularity deviation in the partial measurement region/partial measurement regions in step b-1) of the method, a difference between one or a plurality of values of the perpendicularity deviation in the superordinate total measurement region and one or a plurality of values of the perpendicularity deviation in the partial measurement region is determined, and the difference is included in the correction of the perpendicularity deviation.

The difference between the at least one value of the angular deviation for the total measurement region and the at least one value of the angular deviation for the partial measurement region specifically applies to the partial measurement region under consideration. The difference can be added to a value of the angular deviation of the total measurement region or can be subtracted therefrom, particularly if a measurement is carried out in the partial measurement region. To put it another way, at least one value for the angular deviation of the total measurement region is supplemented by the difference, particularly if measurement is carried out in the partial region.

In another variant, when correcting the angular deviation in the partial measurement region, the at least one value of the angular deviation for the total measurement region is disregarded and only the at least one value of the angular deviation in the partial measurement region is used when correcting the angular deviation. In this variant, in particular in the case of measurement in the partial measurement region, the at least one value of the angular deviation in the total measurement region is replaced by the at least one value of the angular deviation in the partial measurement region. The value of the angular deviation in the partial measurement region is then used when correcting the angular deviation in the partial measurement region and the value of the angular deviation in the total measurement region is disregarded. In this variant, in particular in a computational correction, a data set containing values of the angular deviation of the total measurement region is replaced by a data set containing values of the angular deviation of the partial measurement region. It is also possible to consult one or a plurality of data sets having additional interpolation points for local changes of angular deviations already taken into account for the local correction.

In a partial measurement region of the CMM, in addition to at least one location-dependent angular deviation, it is also possible to include at least one temperature-dependent angular deviation and/or at least one angular deviation dependent on the loading mass (e.g. workpiece or a built-in part) in the correction.

It is possible that an influence of a mass only in a specific partial measurement region leads to a location-dependent angular deviation, that is to say that the angular deviation changes in a location-dependent manner only as a result of mass of the loading. One example is the local positioning of a workpiece. The values of the angular deviation in this case describe the location-dependent change as a result of an initiated force and/or an initiated moment, for example a tilting moment. The invention thus also relates to a correction of an angular deviation that is dependent on a moment, in particular a tilting moment. These force-/moment-governed values of the angular deviation, in the same way as other values, can be stored in the form of a data set in the controller of the CMM.

It is also possible that an influence of a temperature only in a specific partial measurement region leads to a location-dependent angular deviation, that is to say that the angular deviation changes in a location-dependent manner only as a result of the changed temperature. These temperature-governed values of the angular deviation, in the same way as other values, can be stored in the form of a data set in the controller of the CMM.

In a further variant it is possible for a plurality of different angular deviation or changes in a plurality of different angular deviation in a partial measurement region, which can be contained in different data sets, to be additively taken into account or cascaded in the correction, particularly if measurement is carried out in this partial measurement region. Angular deviations which are governed by different causes, for example by temperature influences or initiated forces, can be recorded separately from one another, for example in different data sets, and can be taken into account individually or jointly in the correction, for example by the use of a plurality of correction data sets in the controller. By way of example, values of a location-dependent angular deviation in a partial measurement region and values of a temperature-dependent angular deviation in said partial measurement region can be taken into account jointly. Alternatively, values of a location-dependent angular deviation in a partial measurement region and values of a loading mass-dependent angular deviation in said partial measurement region can be taken into account jointly for the correction.

Methods for determining perpendicularity deviations are known, for example from WO 02090879 A2 and from Hans-Gerd Pressel, "Genau messen mit Koordinatenmeßgeräten", expert Verlag; ISBN 3-8169-1434-9, in particular pages 23-28. Such methods can be employed both for determining perpendicularity deviations in a partial measurement region and for determining perpendicularity deviations in a total measurement region.

Local perpendicularity deviations in one or a plurality of partial measurement regions can be determined in a manner known per se. One exemplary method for determining perpendicularity deviations is the measurement of an angle standard. A further method is the reversal method of a diagonally clamped gauge block in one or more positions. These methods are described in publication "Genau messen mit Koordinatenmessgeraten", Hans-Gerd Pressel (expert Verlag; ISBN 3-8169-1434-9) pages 23-28. Furthermore, local perpendicularity deviations can also be determined by the measurement of a ring gauge.

In one embodiment of the method, the partial measurement region mentioned is the measurement region above a rotary table. Preferably, the angular deviations in the measurement region above a rotary table are corrected by means of the method. The correction of the angular deviations of the CMM in the region above a rotary table make it possible to improve the radial deviation FR, the tangential deviation FT and/or the axial deviation FA.

Angular deviations in a partial measurement region, in particular in the measurement region above a rotary table, can be determined for example with the aid of a step gauge block, in particular by diagonal measurement of a gauge block, or by measurement of an angle standard.

Furthermore, angular deviations can also be determined in the region above a rotary table by means of a test object described in WO 02090879 A2 and in the exemplary embodiments regarding this invention. A method for determining the perpendicularity deviation is presented in the patent application WO 02090879 A2. WO 02090879 A2 describes, particularly with reference to FIG. 4, a test object with two spheres arranged at a distance from the rotation axis of the rotary table. Moreover, the spheres are arranged such that they are likewise at a distance in the direction of the rotation axis and a connecting line between the two spheres approximately intersects the rotation axis. The method for determining perpendicularity deviations by means of a test object is explained in WO 02090879 A2, in particular on pages 17-22 with reference to FIGS. 6, 7, 8 and 10.

With a test object as described in WO 02090879 A2, it is also possible to determine the position of a rotary table axis in the coordinate system of the CMM. Such a method for determining the position of a rotary table axis is also specified in WO 02090879 A2. A test object with two test bodies, preferably spheres, at different levels along the rotation axis, as described e.g. in FIG. 4 of WO 02090879 A2, can be positioned on the rotary table. In order to determine the position of the rotary table axis, different rotational positions of the test bodies are set and reference points of the test bodies are determined. The position of the rotary table axis is subsequently determined from the reference points. For details, reference is made to WO 02090879 A2. By way of example, the rotation axis extends approximately parallel to the Z-axis of the machine coordinate system. In this case, perpendicularity deviations between the X-axis and the Z-axis and between the Y-axis and the Z-axis in the measurement region of the rotary table are compensated for by the specific method. In this embodiment, the position of the rotary table axis in the machine coordinate system is determined, wherein the rotary axial position thus determined does not correspond to the real, mechanical rotational axis on account of the perpendicularity deviation of the X-axis with respect to the Z-axis and of the Y-axis with respect to the Z-axis. Perpendicularity deviations between the X-axis and the Z-axis (xWz) and between the Y-axis and the Z-axis (yWz) are already compensated for by this procedure for determining the position of the rotation axis. The compensation of the perpendicularity deviations between the X-axis and the Z-axis (xWz) and between the Y-axis and the Z-axis (yWz) results in an improvement in the radial deviation FR (maximum permitted value $MPE_{FR}$) and tangential deviation FT (maximum permitted value $MPE_{FT}$). The method according to this embodiment is advantageous for measuring workpieces having a high Z-extent on the rotary table. However, as a result of the inclination of the rotary table axis determined in this way relative to the real mechanical rotation axis, an axial deviation FA (maximum permitted value $MPE_{FA}$) is caused, and the determined deviations FR and FT are improved at the expense of the deviation FA. The axial deviation (=FA value) of the rotation axis is often not of interest in shape inspections on the workpiece. Under these assumptions, it is preferred to optimize the radial deviation (=FR). As a result, the deviations FR, FT and FA are averaged with respect to one another by the method of this embodiment. Furthermore, when determining the position of the rotary table axis according to this method, the perpendicularity deviation yWx is not yet corrected. This can be carried out supplementarily, if desired, for example by means of a diagonal measurement with a correspondingly aligned gauge block.

As mentioned, methods for determining the position of a rotary table axis by measurement at a plurality of positions along the Z-axis are known per se. Such methods are presented in WO 02090879 A2, and reference is expressly made to the abovementioned disclosure of WO 02090879 A2. One method presented in WO 02090879 A2 uses a test object already mentioned, comprising at least test bodies having a surface such that by probing the surface with the probe sphere, it is possible to determine coordinates of at least one reference point of the test body arranged fixedly or reproducibly relative to the surface of the test body in the coordinate system of the base (i.e. the machine coordinate system). One possible test body is a precisely manufactured sphere or a parallelepiped. WO 02090879 A2 describes, in particular with reference to FIG. 4, a test object with two spheres as test bodies that are arranged at a distance from the rotation axis of the rotary table. Moreover, the spheres are arranged such that they are likewise at a distance in the direction of the rotation axis. It is also possible to use a self-centering probing body, such as, for instance, a sphere triad or a cone. If a sphere is used as test body, for example, the midpoint of the sphere in the coordinate system of the base can then be determined unambiguously by probing the surface of the sphere. A detailed description of the method is indicated in WO 02090879 A2, page 5 up to and including page 10 and in the patent claims of WO 02090879 A2. The method is described in FIGS. 4-10 of WO 02090879 A2 and the associated description of the figures on page 12 up to and including page 25, in particular on pages 15-16 and in FIG. 5. In a further method presented in WO 02090879 A2, a cylindrical test body is positioned on the surface of the rotary table and measured in different rotational positions and at different heights. This method is explained on pages 3-4 and in FIG. 3 of WO 02090879 A2.

In one variant of the invention, the partial measurement region, in particular a partial measurement region above a rotary table, in which the at least one value of the angular deviation is determined has a dimensioning the same as or similar to that of a workpiece to be measured, in particular a workpiece to be measured on the rotary table. In particular, determining the at least one value of the angular deviation is carried out with a test object adapted to the size of the workpiece to be measured. The test object maps or substantially maps in particular at least a length of the workpiece or at least a spatial diagonal through the workpiece. This method involves determining the correction values relative to the size of the workpiece, which leads to an improved correction. For determining the angular deviation in a measurement region dimensioned in this way, a gauge block, for example, can be used as test body, wherein the gauge block has a length that traverses or substantially traverses, in particular diagonally traverses, a volume corresponding to the workpiece. To put it another way, the gauge block used for determining the angular deviation is preferably as long or approximately as long as an imaginary line, in particular diagonal, through the workpiece volume. In this regard, in the case of diagonal positioning of the gauge block, the diagonal through the workpiece volume of the workpiece is mapped by the gauge block length to be measured. If the partial measurement region is a region above a rotary table, for example a gauge block can be positioned diagonally on the rotary table, wherein the gauge block diagonally traverses the volume of a workpiece to be measured later.

A further test object that can be adapted to the size of the workpiece to be measured is a test object with two test bodies as already mentioned and described in principle in WO 02090879 A2. The test bodies are at a, preferably identical, distance from the rotation axis of the rotary table and the test bodies are at a distance in the direction of the rotation axis. The distances from the rotation axis are adapted to the width of the workpiece. Preferably, the distances are chosen to be approximately or exactly the same as the width of the workpiece being measured. If the width of the workpiece varies, then the distances with respect to the rotation axis are preferably adapted to the maximum width. The distance in the direction of the rotation axis is adapted to the height of the workpiece. Preferably, the distance in the direction of the rotation axis is chosen to be approximately or exactly the same as the height of the workpiece to be measured.

In one embodiment of the invention, determining the at least one value of the the angular deviation is carried out with a test object adapted to the mass and/or position and/or orientation of the workpiece being measured. With the test object, a loading mass can be simulated and the angular deviation can be carried out under mass conditions at least similar or identical to those prevailing later during the measurement of the workpiece. Mass-dependent proportions of the angular deviation can be detected with such a test object. By way of example, a test object adapted to the mass of the workpiece to be measured can be positioned in a partial measurement region, in particular a partial measurement region above a rotary table. Location- and mass-dependent angular deviations can thus be determined. A test object can be adapted both to the mass and to the size of a workpiece to be measured, as described further above. A test object adapted to the mass of a workpiece to be measured can have a mass distribution which corresponds or substantially corresponds to the mass distribution of the workpiece. In order to obtain a desired mass distribution, additional masses can be attached or attachable to the test object in a variable manner. The test object can be adapted to one or more of the parameters selected from mass, position and/or orientation of the workpiece to be measured. Adaptation to mass and/or (position and orientation) is preferably implemented. Adaptation of the test object to mass and position and orientation of the workpiece to be measured makes it possible to simulate a tilting moment that arises as a result of the mass and the posture thereof (position and orientation).

Specific aspects relating to the correction of the temperature-dependent perpendicularity deviation and the correction of the loading mass-dependent perpendicularity deviation are discussed below.

Correction of the Temperature-Dependent Angular Deviation

Step a-2) of the method mentioned above can be carried out as an alternative to step a-1) and a-3), or cumulatively with step a-1) and/or a-3). Correspondingly, step b-2) of the method mentioned above can be carried out as an alternative to step b-1) and b-3), or cumulatively with step b-1) and/or b-3). A correction of the temperature-dependent angular deviation can therefore be the sole purpose of the method or be added to other corrections.

The temperatures in step a-2) and in step b-2) are preferably ambient temperatures. Preferably, the CMM and a workpiece, if used, are temperature-regulated to a uniform temperature, for example by means of a sufficient temperature-regulating time.

In step a-2), temperature-dependent values of the angular deviation which can be used for the correction can be obtained. Alternatively, information concerning the correction of the temperature-dependent angular deviation can be obtained. Information concerning the correction can be, for example, data of a model of the temperature dependency, in particular a functional relationship between angular deviation and temperature. In the case of a plurality of measurement points in step a-2), for finding a model or functional relationship, for example, a fitting computation can be carried out in order to estimate the unknown parameters of a model or the parameters of a predefined function for the series of measurement data. The functional relationship can thus be based on a function which is adaptable the best by means of an optimization computation, for example a polynomial, but which does not necessarily reproduce the actual physical relationship. On the basis of a model or a fitting computation, the angular deviation can be determined for any other temperature that is different than the temperatures used in a-2).

In step b-2), the correction is carried out, in particular in measurement operation. By way of example, the following steps are carried out:
  coordinate measurement at a measurement temperature,
  optionally determining at least one value of the angular deviation at the measurement temperature if the measurement temperature is different than the temperatures used in step a-2), and
  correcting the angular deviation using at least one value of the angular deviation at the measurement temperature.

Preferably, the CMM and a workpiece used are temperature-regulated uniformly to the measurement temperature, for example by means of a sufficient temperature-regulating time.

A determination of one or a plurality of values of the angular deviation at the measurement temperature is provided only if the measurement temperature is different than the temperatures used in step a-2). If one of the temperatures in step a-2) corresponds to the later measurement temperature, then a renewed determination of the angular deviation is not provided, since it is already known, and this step is merely optional. If the temperatures in step a-2) are different than the later measurement temperature, then the information obtained in a-2) can be used for correcting the temperature-dependent angular deviation. If, by way of example, the measurement temperature is between two temperatures that were taken as a basis in step a-2), then the angular deviation at the measurement temperature can be determined by interpolation or with an abovementioned model or functional relationship.

Correction of the Loading Mass-Dependent Angular Deviation

With the method it is possible to carry out a correction of an angular deviation dependent on a loading mass. The loading mass means a mass that is introduced in any form into the CMM, whereby the CMM is thus loaded.

The weight force caused by a mass, e.g. of the workpiece, or a moment caused by a mass, for example a tilting moment, can be a cause of at least one angular deviation. The invention thus also relates to a correction of an angular deviation that is dependent on a moment, in particular a tilting moment. The mass can lead to an angular deviation over the entire measurement region of a CMM, without differentiating according to partial regions or different locations.

Step a-3) of the abovementioned method can be carried out as an alternative to step a-1) and a-2), or cumulatively with step a-1) and/or a-2). Correspondingly, step b-3) of the abovementioned method can be carried out as an alternative to step b-1) and b-2), or cumulatively with step b-1) and/or b-2). A correction of the loading mass-dependent angular deviation can therefore be the sole purpose of the method or be added to other corrections. As already mentioned above, an angular deviation caused by a loading mass can be corrected in addition to a location-dependent angular deviation.

The loading mass can be, in particular, a workpiece mass or a built-in mass. A built-in mass is a mass which is built into the CMM for any operational requirement or for any purpose and is different than the mass of the workpiece to be measured. A built-in mass can be for example the mass of a built-in rotary table, the mass of a test body, the mass of a sensor, in particular of a measuring head, the mass of a probe system, the mass of an extension between sleeve and measuring head, or between measuring head and probing element, the mass of a workpiece clamp, the mass of a mount e.g. for a laser mirror for CAA data capture or a mass of some other built-in part. A built-in mass can be the mass of an exchangeable part such as a sensor or measuring head. CMMs have, for example, exchangeable sensors/probes that can have different masses. The respective mass can constitute the entire loading mass or part of the loading mass. A further example of an exchangeable part is a temporarily present rotary table. The loading mass can also be a test mass introduced into a CMM for the purpose of determining the loading mass dependence of the angular deviation.

In step a-3), loading mass-dependent values of the angular deviation which can be used for the correction can be obtained. Alternatively, information concerning the correction of the loading mass-dependent angular deviation can be obtained. Information concerning the correction can be, for example, data of a model of the loading mass-dependency, in particular a functional relationship between angular deviation and loading mass. In the case of a plurality of measurement points in step a-3), for finding a model or functional relationship, for example, a fitting computation can be carried out in order to estimate the unknown parameters of a model or the parameters of a predefined function for the series of measurement data. The functional relationship can thus be based on a function which is adaptable the best by means of an optimization computation, but which does not necessarily contain the actual influencing factors. On the basis of a model or a functional relationship, the angular deviation can be determined for any loading mass.

In step b-3), the correction is carried out, in particular in measurement operation. Preferably, the following steps are carried out:

coordinate measurement in the case of loading with a loading mass, wherein the loading mass includes the mass of a workpiece or is the mass of a workpiece, optionally determining at least one value of the angular deviation in the case of the loading mass if the loading mass is different than the loading masses used in step a-3), and correcting the angular deviation using the at least one value of the angular deviation in the case of the loading mass.

Besides the workpiece, one or more other masses can also be present, e.g. built-in masses which contribute to the total loading mass.

A determination of one or a plurality of values of the angular deviation in the case of the loading mass is provided only if the loading mass is different than the loading masses used in step a-3). If one of the loading masses in step a-3) corresponds to the later loading mass (including workpiece), then a renewed determination of the angular deviation can be omitted and this step is merely optional.

If all the loading masses in step a-3) are different than the later loading mass during the measurement, then the angular deviation can be determined on the basis of the information obtained in a-3). If, by way of example, the value of the loading mass in the measurement is numerically between two values of loading masses which were taken as a basis in step a-3), then the angular deviation in the case of the loading mass can be determined by interpolation or by means of an abovementioned model or functional relationship.

Even further aspects that are generally applicable to all method variants are described below:

A computer program is preferably used in the method according to the invention and the CMM according to the invention, which is also described below. The computer program is also referred to as measurement software. Inter alia, the influencing variables that influence the angular deviation, such as partial regions, temperatures and loading masses, can be input into the computer program.

By specifying a measurement region within the CMM, e.g. the region occupied by a workpiece, the controller knows the range of movement of the measuring head or sensor of the CMM. The controller can decide whether the measurement region lies within a partial region for which at least one value of the angular deviation was determined. Depending on the known current position of the measuring head or sensor, a check can be made as to whether or not it is (still) situated in the partial region. Up to a certain tolerance range adjacent to the partial region, it can be accepted that the measuring head or sensor is measuring outside the partial region. Moreover, even in the tolerance range the at least one value of the angular deviation can still be taken as a basis for the angular deviation which applies to the partial region. The tolerance range can be set in the CMM controller and can be monitored by the controller.

If the partial region or the tolerance range is left and the values of the angular deviation are no longer valid for said partial region, then this can either be ignored, i.e. the previous values are maintained, which leads to a less accurate correction with increasing distance from the partial region or tolerance range. In another alternative, in the event of the partial region being left, other values of an angular deviation can be taken as a basis for the correction, for example values of a superordinate partial region, values of a total measurement region, or values of an adjacent partial region in which the measuring head/sensor is now situated or still situated.

Analogous procedures apply for the influencing variable of temperature and the influencing variable of the loading mass: if the temperature is changed and a value of the angular deviation at the previous temperature is no longer valid, then this can either be ignored, i.e. the previous value can be maintained, which leads to a less accurate correction with increasing distance from the validity range. In another alternative, in the event of the temperature being left and in the event of setting to a new temperature, the values of the angular deviation at the new temperature can be taken as a basis for the correction. The same applies analogously in the case of a change in the loading mass.

In the case of a change in the value of an angular deviation, jumps or discontinuities can occur, which can be smoothed, for example with known smoothing functions, such as splines or polynomials, or by means of additional interpolation points.

The abovementioned measurement software is preferably designed to automatically take account of changes in a value of the angular deviation if a partial measurement region or tolerance range is left and/or a temperature is changed and/or a loading mass is changed. Information about the range of movement of the CMM can be stored in a computer, in particular by means of inputting into a program or measurement software. The software can decide, for example, whether a travel range lies within a specific partial measurement region. The measurement software can automatically switch to a valid value of the angular deviation or cause the controller to take the valid value of the angular deviation as a basis for the correction if measurement is carried out in a different measurement region for which the relevant value is valid, and/or measurement is carried out at a changed temperature for which the value is valid, and/or measurement is carried out in the case of a changed loading mass, e.g. as a result of a changed workpiece, for which the value is valid. The other values are then valid for the other measurement region, the other temperature and/or the other mass. In the case of the automatic change in the value, a discontinuity that possibly occurs can be smoothed as described above, or be rectified by additional interpolation points, in order to enable better closed-loop control of the measuring machine.

Different values of angular deviations for different partial regions, temperatures or loading masses are preferably stored in the form of a data set, or in the form of a plurality of different data sets, for example in a controller (also described below) of a CMM or a correction device (described below) that can be integrated into a controller or a computer.

In one embodiment of the invention, a method is specified wherein
  for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation, and/or
  for at least two temperatures in each case at least one value of an angular deviation, and/or information for correcting a temperature-dependent angular deviation, and/or
  for at least two loading masses in each case at least one value of an angular deviation, and/or information for correcting a loading mass-dependent angular deviation
is/are stored in the coordinate measuring machine and the at least one value and/or the information for the relevant partial measurement region or total measurement region and/or for the relevant temperature and/or for the relevant loading mass is/are used, in particular is/are used automatically, in the correction.

The at least one value or the information can be stored for example in the computer or the controller of the CMM. If, at an arbitrary later point in time, a measurement is carried out in the partial measurement region or total measurement region, at the temperature or with the loading mass for which a value or information is stored, it is possible to have recourse to the value or the information for the correction. The use of the valid value or of the valid information for the purpose of correcting the angular deviation is preferably implemented in an automated manner. Information about the range of movement of the CMM can be stored in a computer, in particular by inputting into a program or measurement software. The valid value of the angular deviation can be automatically taken as a basis in the controller, in particular at the instigation of the measurement computer or the measurement software, if measurement is carried out in a new measurement region and/or measurement is carried out at a changed temperature and/or measurement is carried out in the case of a changed loading mass, e.g. as a result of a changed workpiece.

By way of example, a measurement plan can be provided in a computer of the CMM, which measurement plan contains one or a plurality of partial measurement regions, temperatures and/or loading masses for which values or information concerning the perpendicularity deviation are/is already stored in the controller. Upon instigation by the computer, correction data already stored in the CMM, in particular in the controller, can be activated if measurement is carried out in the relevant partial measurement region, at the relevant temperature and/or in the case of the relevant loading masses. In the course of the operating time of the CMM, values or information concerning different partial measurement regions, temperatures and/or loading masses can gradually be stored and provided for a correction of the angular deviation. A CMM controller or measurement software designed for this purpose is also referred to as a "self-learning system", in the sense that the need for determining values or information concerning the angular deviation on the basis of information already stored is increasingly reduced over the course of time. A CMM is thus preferably designed such that values and information about the angular deviation in different partial measurement regions, at different temperatures and/or loading masses can be managed.

In a variant which can be combined in particular with the embodiment presented above, a method is specified wherein
  the point in time of the determination of the values or of the information is assigned to the values of the angular deviation or the information for correcting the angular deviation,
  a time period from the point in time of the determination until the point in time of the correction of the angular deviation is determined,
  a guideline value is assigned to the time period, wherein the guideline value contains information about the reliability and/or validity of the values of the angular deviation or the validity of the information for correcting the angular deviation.

A point in time should be understood to be, in particular, a date and/or a time of day. The time period from the point in time of the determination until the point in time of the correction of the angular deviation can be determined if the point in time of the correction is fixed, for example the point in time of a measurement of a workpiece with the CMM.

A guideline value provides information about whether the values of the angular deviation determined at an earlier point in time should be considered still to be reliable or still to be valid. The longer the time period, the lesser the extent to which the validity can be assumed, for example, since external conditions or properties of the CMM may have changed or the probability of such changes increases as the time period increases. Some examples for determining a guideline value are specified below.

A relationship between time period and guideline value can be assumed by the user, i.e. a guideline value can be assumed depending on the length of the time period. A guideline value can instead be determined on the basis of measurements. By way of example, after specific points in time, angular deviation values can be determined anew and the newly determined values can be compared with the previously determined values and a relative or absolute deviation between values can be determined therefrom. A relationship between second space and actual or probable deviation can be determined therefrom. The deviation can itself be used as a guideline value. The deviation as actual or probable deviation can represent a guideline value. Alternatively a deviation value can be assigned a characteristic figure which expresses the relative or absolute magnitude and/or type of the deviation and which can be used as a guideline value. Ranges of deviation values can be defined, for example relative ranges such as 0-10%, 11-20%, 21-30% etc., and each range can be assigned a characteristic figure whose value indicates a statement about the reliability of the angular deviation value.

As an alternative or in addition to a guideline value, it is possible to define a threshold value that indicates whether earlier determined values of the angular deviation or the information for the correction of the angular deviation should be discarded and determined anew. The definition of the threshold value can be dependent on the requirements made of the measurement accuracy. A threshold value can be for example a guideline value that represents a defined threshold. If, by way of example, the guideline value expresses by an actual or probable deviation of the current angular deviation from an earlier angular deviation, then a specific deviation, for example 10% or more from an earlier determined value, can be defined as threshold value. In a further example, the threshold value can be a specific characteristic figure. In yet another example, the threshold value can be a specific time period. If the time period has been reached or exceeded, then earlier determined values of the angular deviation or the information for the correction of the angular deviation should be discarded and determined anew.

In a further aspect, the invention relates to a coordinate measuring machine designed for carrying out the method described in this description in an arbitrary embodiment or arbitrary combinations of embodiments. The invention also relates to the use of a coordinate measuring machine for carrying out the method. The coordinate measuring machine is, in particular, a CMM of gantry design.

The coordinate measuring machine can have in arbitrary combination all substantive features that have already been described on the basis of the description of the method according to the invention, such as a rotary table, for example.

In particular, the coordinate measuring machine comprises a determining device configured to determine the values of the angular deviation. As described elsewhere herein, angular deviations can be determined using a gauge block or test object. A gauge block or test object is not considered to be part of the determining device. The determining device can serve for processing information obtained by measurement of a gauge block or test object, wherein values of the angular deviation are determined by the processing of the information. The determining device can be integrated into a computer described below and/or can be part of a controller described below. Alternatively the function of the determining device can be performed by a computer and/or a controller. That is to say that computer and/or controller can also be determining device, besides the fulfilling of further known functions.

Alternatively or additionally, the coordinate measuring machine can comprise a correction device configured to carry out the correction of the angular deviation and, if appropriate, of one or a plurality of guidance deviations (axis deviations). The correction device is designed, in particular, to perform a correction of the angular deviation of a real angle from an ideal angle between movement axes/travel axes of the coordinate measuring machine. The correction device can be integrated into a computer described below and/or can be part of a controller described below. Alternatively the function of the correction device can be performed by a computer and/or a controller. That is to say that computer and/or controller can also be correction device, besides the fulfilling of further known functions.

The correction device is designed in particular
- in the case of coordinate measurement in a partial measurement region of the coordinate measuring machine, to correct an angular deviation using at least one value of the angular deviation in the partial measurement region, and/or
- in the case of coordinate measurement at a measurement temperature, to correct an angular deviation using at least one value of the angular deviation at the measurement temperature, and/or
- in the case of coordinate measurement in the case of loading with a mass, to correct an angular deviation using at least one value of the angular deviation in the case of the loading with the mass, preferably in interaction with a controller of the CMM or as part of a controller.

Even more specifically, the correction device is designed,
- in the case of coordinate measurement in a total measurement region of the coordinate measuring machine, to correct an angular deviation using at least one value of the angular deviation in the total measurement region and, in the case of coordinate measurement in a partial measurement region of the coordinate measuring machine, to correct an angular deviation using at least one value of the angular deviation in the partial measurement region, and/or
- in the case of coordinate measurement in a first partial measurement region of the coordinate measuring machine, to correct an angular deviation using at least one value of the angular deviation in the first partial measurement region and, in the case of coordinate measurement in a second partial measurement region of the coordinate measuring machine, to correct an angular deviation using at least one value of the angular deviation in the second partial measurement region, and/or
- in the case of coordinate measurement at a first measurement temperature, to correct an angular deviation using at least one value of the angular deviation at the first measurement temperature, and in the case of coordinate measurement at a second measurement temperature, to correct an angular deviation using at least one value of the angular deviation at the second measurement temperature, and/or in the case of coordinate measurement in the case of loading with a first mass, to correct an angular deviation using at least one value of the angular deviation in the case of the loading with the first mass, and in the case of coordinate measurement in the case of loading with a second mass, to correct an angular deviation using at least one value of the angular deviation in the case of the loading with the second mass.

The coordinate measuring machine can comprise a controller that controls the movement of the movable parts of the CMM along the movement axes. Furthermore, the controller can fulfill the following functions, programming and control of the measurement sequence, data acquisition and evaluation, preferably in interaction with a computer.

The controller is preferably designed for carrying out the methods described. In particular, said controller can comprise the determining device. Alternatively or additionally, said controller can comprise the correction device, or a part thereof, or wholly or partly fulfill the function of the correction device. Alternatively, the controller can be connected to the correction device, for example to a computer that (partly) contains the correction device or wholly or partly fulfills the function of the correction device. In all cases, the correction device can enable the controller to carry out the movement control on the basis of the correction of the location-dependent angular deviation. The accuracy of the movement control is thus improved. Moreover, the correction preferably also increases the precision of the determination of the instantaneous position of a sensor and/or probe for measuring coordinates of a workpiece and thus increases the precision of the measurement of the coordinates.

In particular, the coordinate measuring machine comprises a computer having measurement software (designated in summary as "computer" hereinafter) that is designed for carrying out the methods described above. The computer is preferably connected to the controller for exchanging information, such as commands and status messages, for example. The computer can carry out the processing of the data obtained. The correction device already mentioned can be integrated into the computer, for example in the context of a program, for example as part of the measurement software. Further possible functions of the computer are: automatic execution of the measurement program, transformation of the measurement points from the machine coordinate system into any arbitrary workpiece coordinate system, evaluation and representation of the measurement results.

In one embodiment, the communication of computer and controller is designed in such a way that the computer notifies the controller that measurement is carried out in a partial measurement region. This can be realized e.g. within a check plan by the activation of a button in the interface of measurement software. Further possibilities are, without restriction, a check box, a foot-operated switch, a command or a script command, such as e.g. a PCM command (parameter coded measurement sequence), temperature sensors, other sensors, such as strain gauges that detect a measuring table flexure, or mechanical switches on pallet systems.

The steps of a measurement plan, such as travel distances along the CMM axes, and data sets for correction for one or a plurality of partial measurement regions, for a total measurement region, for temperatures and/or for loading masses, can be input into measurement software of the computer. This information can be stored by the computer and saved in the correction device, which can be integrated into the computer or the controller, in particular in the form of machine-readable data sets, such as so-called CAA data sets or CAA fields. Correction data sets are preferably saved on the controller computer.

The correction device can carry out an automatic correction with the data set assigned to a partial measurement region if measurement is carried out in this measurement region, and/or the correction with the data set assigned to a total measurement region if measurement is carried out in the total measurement region and outside the partial measurement region, and/or the correction with the data set assigned to a temperature if measurement is carried out at this temperature, and/or the correction with the data set assigned to a loading mass if measurement is carried out in the case of this loading mass.

In the case of a location-dependent correction, switching to a data set (a CAA field) for the correction or switching in a second data set at the location of the current measurement are preferred optimization possibilities. As an alternative thereto, it is likewise possible for local angular deviations to be described and corrected by means of an individual data set containing the information concerning angular deviations in a plurality of partial measurement regions. Information concerning angular deviations in a plurality of partial measurement regions can be added in a data set, for example.

As a result of the inclusion of information concerning angular deviations in a plurality of partial measurement regions, in particular as a result of addition, discontinuities can arise in a data set, for example in the transition region between different partial measurement regions, in particular in the transition from a superordinate to a subordinate partial measurement region. Discontinuities are disadvantageous for the closed-loop circuit of the CMM controller and they are preferably smoothed by means of a known mathematical smoothing method, in particular a known smoothing functions. Examples of smoothing functions are splines or polynomials. A combination of both methods is also conceivable.

The coordinate measuring machine can comprise a memory in which the following information is stored:

for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation, and/or for at least two temperatures in each case at least one value of an angular deviation, and/or information for correcting a temperature-dependent angular deviation, for at least two loading masses in each case at least one value of an angular deviation, and/or information for correcting a loading mass-dependent angular deviation.

The information can be used for correction in the context of the method according to the invention. The memory can be part of the correction device, of the controller or of the computer.

Furthermore, the scope of the invention includes a computer program which carries out and/or controls the steps of the method according to the invention. In particular, the computer program comprises program code means that can be stored on a computer-readable data carrier.

Preferably, a measurement plan can be input into the computer program, which measurement plan contains one or a plurality of partial measurement regions, for example contains measurements and/or travel movements in one or a plurality of partial measurement regions, and/or contains one or a plurality of measurement temperatures, and/or contains one or a plurality of loading masses.

Furthermore, the scope of the invention includes a data carrier on which is stored a data structure which carries out and/or controls the steps of the method according to the invention after being loaded into a main and/or primary memory of a computer or computer network.

The invention is described below on the basis of specific exemplary embodiments. In the figures:

BRIEF DESCRIPTION OF THE SEVERAL VIEWS OF THE DRAWING

FIG. 8 shows an illustration of a correction line xRy with included global perpendicularity deviation, FIGS. 9a-b show flow diagrams of different variants of the method according to the invention.

DESCRIPTION OF THE INVENTION

Figure 1:
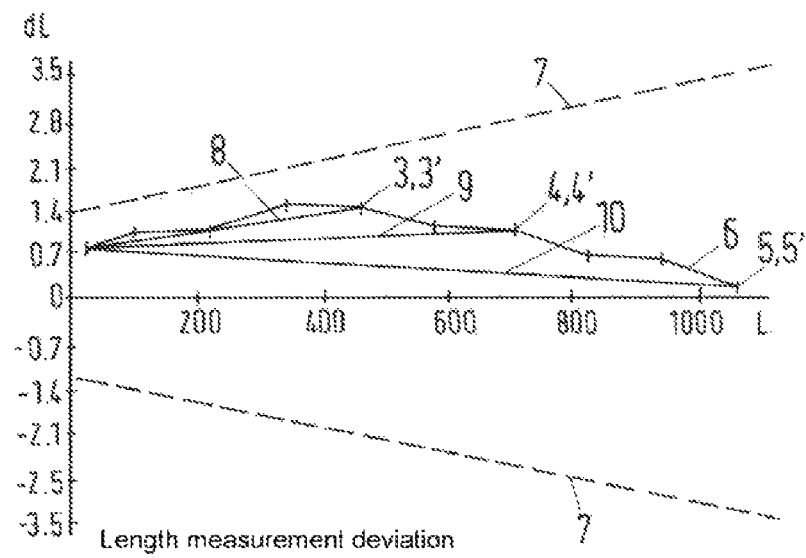
FIG. 1 shows step gauge block measurement in the YZ plane for determining a perpendicularity deviation.
Figure 2:
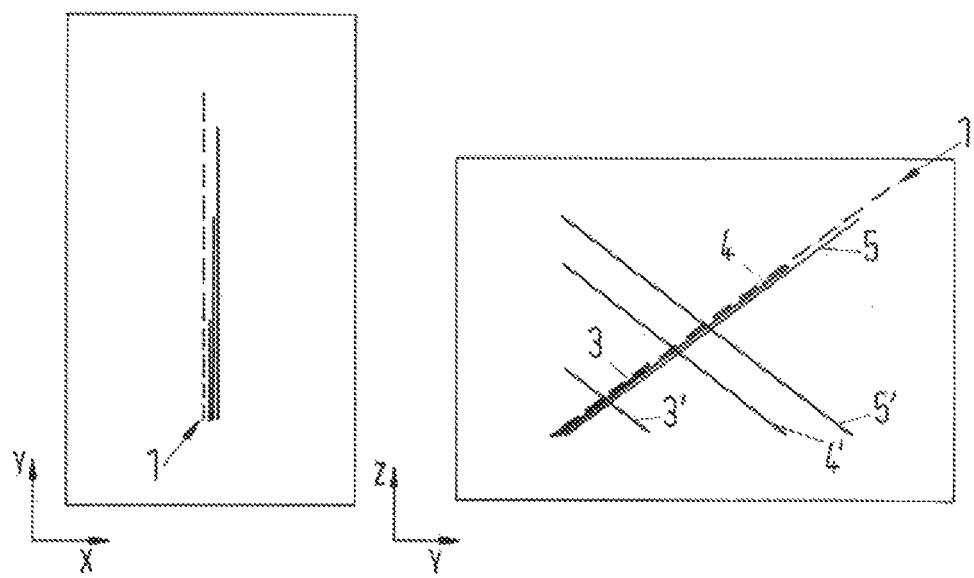
FIG. 2 shows capture positions of the gauge block for determining the perpendicularity deviations illustrated in FIG. 1.

FIG. 1 shows various perpendicularity deviations in the Y-Z-plane of a CMM. A step gauge block is positioned as illustrated in FIG. 2. A step gauge block 1 is positioned diagonally in the Y-Z-plane of the machine coordinate system. FIG. 2 on the right shows the view of the Y-Z-plane and FIG. 2 on the left shows the viewing direction parallel to the Y-Z-plane. FIG. 2 on the right shows the diagonal arrangement of the gauge block 1, wherein the reference signs 3, 4, 5 depict three different distances within an identical step gauge block. The reference sign 5 shows the longest gauge block distance, the reference sign 4 shows a middle gauge block distance, and the reference sign 3 shows the shortest gauge block distance that was measured. During the measurement of the distances 3, 4 and 5, the gauge block stands diagonally upward toward the right if the viewing direction shown in FIG. 2 is taken as a basis. Further measurements of the distances 3, 4 and 5 are carried out by the gauge block being rotated by 180° about the Z-axis, such that it is likewise arranged diagonally, and at the same angle, but this time is arranged from the bottom right upward toward the left in the Y-Z-plane. The distances thus measured are designated 3', 4' and 5'. In the viewing direction shown in FIG. 2 on the right, a cruciform arrangement of the distances 3 and 3', 4 and 4', and 5 and 5' results. For measuring the distances 3', 4' and 5', the gauge block was in each case offset somewhat in order that a cruciform arrangement with respect to the distances 3, 4 and 5 could be attained and measurement could be carried out in the same axial section. The distances 3, 4, 5, 3', 4', and 5' were measured multiply in each case. The result is shown in FIG. 1. The abscissa in the plot according to FIG. 1 shows the measurement length in millimeters of different length measurements by the gauge block, wherein the measurements 3, 3', 4, 4' and 5, 5' are contained along further length measurements of further distances of the step gauge block. The length deviation dL with respect to the calibrated corresponding gauge block lengths is plotted on the ordinate. The arithmetic mean value of the length deviation was calculated from a plurality of length measurements on respectively identical lengths, wherein the gauge block 1 was in each case also rotated by 180° about the Z-axis, as shown in FIG. 2 on the right. In this case, curve 6 in FIG. 1 runs through the calculated mean values and thus describes the determined length measurement deviation. Curves 7 in FIG. 1 describe the maximum permissible length deviation $MPE_E$, calculated according to the formula A+L/B, wherein L is the respective measurement length. The determined length measurement deviation $E_L$, designated by the curve 6, must lie within curves 7 in order to fulfill the specification. The following relationship holds true for the perpendicularity deviation R:

$$R = \arctan(dL/L)\sin W \cos W$$

where
R=perpendicularity deviation
dL=length deviation
L=measured length of the gauge block
W=angle between gauge block and CMM axis
(cf. book "Genau messen mit Koordinatenmeßgeräten" by Hans-Gerd Pressel, expert Verlag; ISBN 3-8169-1434-9, pages 23-28)

In this case, the angle W with respect to the CMM axis is the angle between the gauge block and the Y-axis, and the perpendicularity deviation, in the case of the arrangement of the gauge block 1 as shown in FIG. 2, is the deviation yWz, i.e. the tilting of the Z-axis with respect to the Y-axis. Since the angle W is constant, the perpendicularity deviation is dependent on the ratio dL/L. In the case of the gauge block lengths 3 and 3', the ratio dL/L corresponds to the gradient of the straight line 8 depicted in FIG. 1 from the start of the gauge block length 3 and 3' to the end of the gauge block 3 and 3'. The same correspondingly holds true for the other measured gauge block lengths 4, 4' and 5, 5', for which the gradient dL/L is indicated by the straight lines 9 and 10, respectively. As is evident from FIG. 1, different ratios dL/L or different gradients of the straight lines 8, 9 and 10 are obtained for three different measured gauge block lengths. In accordance with the formula presented above, different perpendicularity deviations R are thus obtained for different measured gauge block lengths. Therefore, in this example, a different perpendicularity deviation is obtained depending on the measurement length over which the perpendicularity is determined. The step gauge block measurement illustrated in FIG. 1 is only one sector in the measurement region. In other words, the perpendicularity error can deviate at other measurement locations, and can for example be even greater.

During CMM acceptance, the length deviation is determined such that the lengths residual errors dL of the CMM are within the required tolerance curves 7. In general, the length deviation is determined over ⅔ of the measurement region, and moreover proceeding from the center of the measurement region, as explained with reference to FIG. 3. The perpendicularity deviations for different lengths L of the gauge block are likewise determined in a central partial region of the measurement region, wherein, as explained above, different quotients dL/L and thus different perpendicularity deviations are obtained. The different perpendicularity deviations are then averaged and the mean value of the perpendicularity deviations is assumed to be a global perpendicularity deviation. In other words, it is assumed that the mean value of the perpendicularity deviations holds true for the total measurement region. The correction values of the global perpendicularity deviation are stored in the controller in a first correction file. Other weighting methods are also conceivable. In machines with less stringent accuracy requirements (in general also greater accuracy stipulation $MPE_E$), the perpendicularity deviations can also be determined only on one length L of the gauge block. The gauge block generally lies in the center of the measurement region, and only one quotient dL/L is formed, i.e. only one perpendicularity deviation, without averaging.

Figure 3:
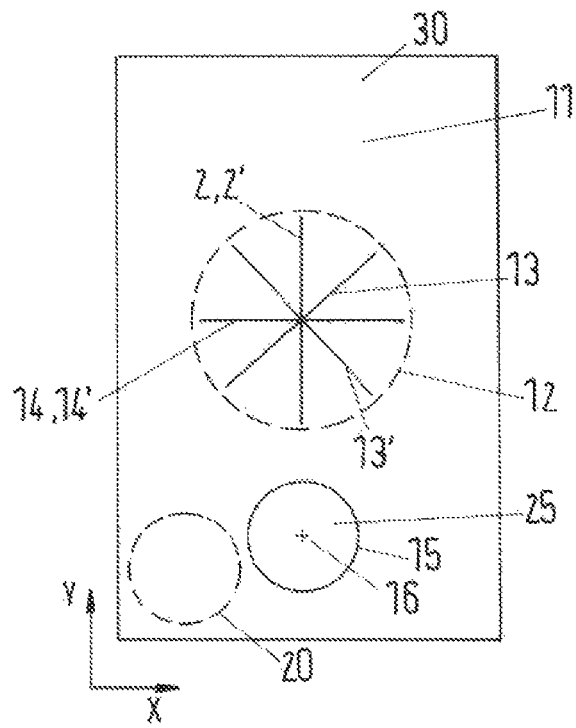
FIG. 3 shows a basic illustration of the rotary table position in comparison with a location at which the global perpendicularity deviation is determined.

In FIG. 3, the observer views the measuring table 11 of the CMM or the X-Y-plane from above. A central region 12 is demarcated by a dashed line in the center of the measuring table 11.

The space above the measuring table 11 forms a total measurement region 30, here illustrated two-dimensionally in the plan view. The total measurement region 30 is demarcated by the boundaries of the measuring table in the plan view. However, the total measurement region in cross section can also be somewhat smaller than the area of the measuring table, since space for the movement of a gantry is required, this space not being available for measurement, and because not every location on the measuring table can be reached by a measuring head. Alternatively, FIG. 3 can be viewed such that only part of the measuring table 11 is illustrated.

The global perpendicularity deviation for the total measurement region 30 is determined in the central region 12, as explained above. This is carried out by a step gauge block being positioned in six positions, wherein different length sections of the gauge block are measured in each position. In order to determine the perpendicularity deviation yWx, the gauge block is brought into the positions 13 and 13', wherein 13' represents a position rotated by 180° relative to 13. The length measurement is carried out in the X-Y-plane. In order to determine the perpendicularity deviation xWz, the gauge block is brought into the positions 14 and 14', wherein 14' represents a position rotated by 180° compared with 14. The positions 14 and 14' represent diagonals in the X-Z-plane, in the same way as 13 and 13' represent diagonals in the X-Y-plane. Consequently, the positions 14 and 14' form a crossed arrangement, which is not visible in the case of the chosen viewing direction from above. In order to determine the average global perpendicularity deviation yWz (deviation between Y-axis and Z-axis) the gauge block is brought into the positions 2 and 2', wherein 2' represents a position rotated by 180° compared with 2. The positions 2 and 2' represent diagonals in the Y-Z-plane. The arrangement 2 is shown in FIG. 2. The crossed diagonal arrangement 2, 2' is not visible in the case of the viewing direction from above chosen from FIG. 3. As illustrated in FIG. 2, different lengths of the step gauge block are measured depending on gauge block positions. These are the lengths 3, 4 and 5 in the case of position 2, and the lengths 3', 4' and 5' in the case of position 2'. Different perpendicularity deviations yWz are obtained from the measurements of different lengths of the step gauge block in positions 2 and 2', as explained above, and these different perpendicularity deviations are averaged to form global perpendicularity deviation yWz in the total measurement region 30. In an analogous manner, different perpendicularity deviations yWx (deviation between X-axis and Y-axis) are obtained from the measurements of different lengths of the step gauge block in positions 13 and 13' and different perpendicularity deviations xWz (deviation between x-axis and z-axis) are obtained from the measurements of different lengths of the step gauge block in positions 14 and 14', said perpendicularity deviations being averaged to form the global perpendicularity deviation in the total measurement region 30 yWx and xWz, respectively.

FIG. 3 also shows a rotary table 25 in the measurement region of the CMM, wherein the rotary table is situated in the front measurement region. The region or space 15 above the rotary table, which here is only illustrated two-dimensionally, forms a partial measurement region 15. A further partial measurement region 20 is illustrated at the bottom left. The partial measurement region 20 is not a region above a rotary table, but rather a subregion of the total measurement region 30. In the partial measurement region 20, by way of example, a workpiece can be positioned on the base. Further partial measurement regions, not illustrated, can be present or defined.

The rotation axis 16 of the rotary table 25 is perpendicular to the area of the measuring table 11. Significant differences between the perpendicularity deviation and the global, here averaged, perpendicularity deviation of the total measurement region 30 are present at the location of the rotary table. The differences in the perpendicularity deviations are determined and corrected in the partial measurement region 15 above the rotary table 25 by means of an additional perpendicularity correction.

Figure 4:
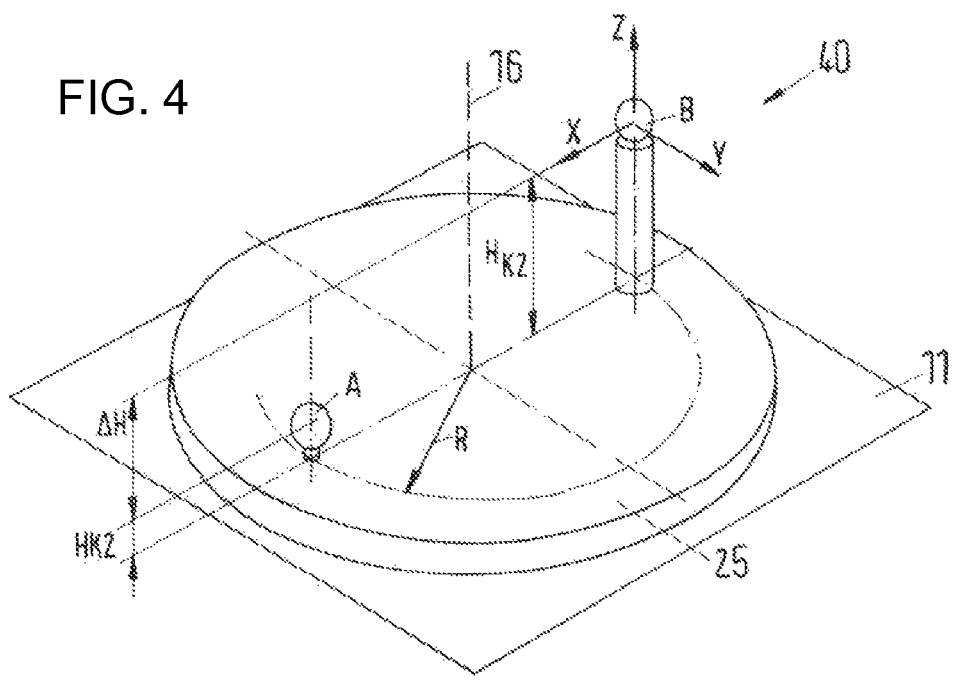
FIG. 4 shows a construction for determining the perpendicularity deviation and/or rotary axial position in space with two test spheres.

The perpendicularity deviation in the partial measurement region 15 above the measuring table can be determined by means of an apparatus 40 comprising two spherical probing bodies A, B, which is shown in FIG. 4. The apparatus 40 can be positioned on the rotary table. The perpendicularity deviations xWy, yWx, xWz in the partial measurement region above the rotary table are obtained, whereas the abovementioned perpendicularity deviations xWy, yWx, xWz are the global perpendicularity deviations. Two spheres A, B are arranged at a distance R, relative to the sphere midpoint, from the rotation axis 16 of the rotary table. Moreover, the spheres A, B are arranged such that in the direction of the rotation axis 16 they are at a distance ΔH a relative to the sphere midpoints, and a connecting line between the two spheres approximately intersects the rotation axis 15. Measurement of the arrangement of the spheres A, B in different rotational positions of the rotary table yields computationally the perpendicularity deviations xWz, yWz, yWx at the location of the rotary table, as explained in WO 02090879 A2, in particular on pages 17-22 with reference to FIGS. 6, 7 and 8 therein.

The perpendicularity deviations for the rotary table 25 are determined at the location of the rotary table. Up to a certain tolerance range, which can be predefined and monitored, for example, by the CMM controller, the location can vary.

The perpendicularity deviation in the partial measurement region 20, or some other partial measurement region, can be determined by means of a gauge block which is positioned in the partial measurement region 20, or some other partial measurement region, in different orientations, in the same way as described above for the region 12. The perpendicularity deviation in the partial measurement region 20, or some other partial measurement region, can alternatively also be determined by means of an apparatus analogous to FIG. 4 if the spheres A, B are mounted rotatably about an axis 16, which in this case is not a rotary table axis. The apparatus can have a foot and a plate that is rotatable about a rotation axis 16, as described in WO 02090879 A2 with reference to FIG. 10 therein. Measurement of the arrangement of spheres A, B in different rotational positions yields computationally the perpendicularity deviations xWz, yWz, yWx in the partial measurement region 20, as explained in WO 02090879 A2, in particular on pages 22-25 with reference to FIG. 10 therein.

The perpendicularity deviations for the partial measurement region 20 are determined at the location of the partial measurement region 20. Up to a certain tolerance range, which can be predefined and monitored, for example by the CMM controller, the location can vary.

As mentioned, the correction values of the global perpendicularity deviation, i.e. the values valid for the total measurement region 30, are stored in the controller of the CMM in a first correction file.

The correction values of the local perpendicularity deviation which are valid for the partial measurement region 15 above the rotary table 25 are stored in the controller in a second correction file or in the same file, e.g. in a different variable, wherein the variant with a second file is described below. The perpendicularity deviations in the partial measurement region 15 above the rotary table can be minimized by means of the second file. The correction data from the second file are taken as a basis if measurement is carried out in the partial measurement region 15 above the rotary table, and the first file is deactivated. Preferably, the correction from the second file is activated only if measurement is carried out with an active rotary table. The rotary table is activated in the check plan of the CMM. In other words, via the check plan the user indicates whether measurement is carried out in the partial measurement region 15 above the rotary table, e.g. if a workpiece positioned on the rotary table is measured, or whether measurement is carried out alongside the rotary table, e.g. if a workpiece positioned on the base is measured.

In a manner analogous to that for the partial measurement region above the rotary table, the method can also be carried out for the partial measurement region 20. The correction values of the local perpendicularity deviation in the partial measurement region 20 can be stored in a correction file, which can be a second correction file or a third correction file if, for example, the second correction file is already a correction file for the partial measurement region 15 above the rotary table 25.

In another variant (variant 2) of the correction computation, difference formation is performed. The global perpendicularity deviation determined in the region 12 for the total measurement region 30 is stored in a first correction file. The local perpendicularity deviation for the partial measurement region 15 is determined in the manner as specified above. A difference between the local perpendicularity deviation values and the global perpendicularity deviation values is then formed and stored in a second correction file, or in the same file, e.g. in a different variable, wherein the variant with a second file is described below. Difference values are identified hereinafter by the symbol "Δ". From the global perpendicularity deviation and the local perpendicularity deviation determined in the partial measurement region 15 above the rotary table 25, a change or difference in the perpendicularity deviation between the total measurement region 30 (determined in the region 12) and the partial measurement region 15 can therefore be determined and stored in the second file. If measurement is carried out in the partial measurement region 15 above the rotary table 25 in measurement operation, the determined perpendicularity deviation difference (second file) can be activated in addition to the global perpendicularity deviation that holds true for the total measurement region 30, such that the second correction file is activated in addition to the first correction file. The difference between the perpendicularity deviations is taken into account by activation of the second file and is added to the global perpendicularity deviation or, depending on the sign, is subtracted therefrom. In other words, both correction files are active in the case of measurements on the rotary table 25.

Variant 2 for the partial measurement region 20 can be carried out in a manner analogous to that for a rotary table. From the global perpendicularity deviation and the local perpendicularity deviation determined in the partial measurement region 20, therefore, a change or difference in the perpendicularity deviation between the total measurement region 30 (determined in the region 12) and the partial measurement region 20 can be determined and stored in a second file, or in a third file if data concerning the rotary table are already stored in the second file.

The user can measure a workpiece with a previously defined check plan. If positions of the measuring head or sensor outside the tolerance range occur here, the controller issues an error message because the location-dependent perpendicularity deviation is not valid in this range. The location-dependent perpendicularity deviation is then determined anew e.g. using a test body according to FIG. 4.

For both variants mentioned above, the following holds true with use of a rotary table: the data concerning the local perpendicularity deviation, that is to say for example the data for the second file, have to be determined only once for CMMs having a fixedly built-in rotary table 25. For CMMs having a displaceable rotary table, this correction is preferably determined anew whenever the position of the rotary table is changed. A position check is proposed here.

A local perpendicularity deviation valid for a specific partial measurement region, once it has been determined, can be stored, for example in the controller of the CMM. If later a rotary table is placed into said partial measurement region again, or if a workpiece is placed into said partial measurement region, a renewed determination of the perpendicularity deviation is not necessary. The information concerning the perpendicularity deviation already determined previously can be used. If the position of the rotary table within the partial measurement region, if appropriate taking account of a tolerance range, is not complied with, then an indication can be given by the measurement computer that the perpendicularity deviation must be determined anew at the location of the rotary table. By means of an apparatus 40 shown in FIG. 4, the position of the rotary table axis can be determined and, as necessary, the perpendicularity deviation at the location of the rotary table can also be determined anew.

A measurement plan can be provided in a computer, which measurement plan contains one or a plurality of partial measurement regions for which data concerning the perpendicularity deviation have already been stored in the controller. At the instigation of the computer, the correction data already stored in the controller can be activated if measurement is carried out in the relevant partial measurement region. Over the course of the operating time of the CMM, different local perpendicularity deviations in the global measurement volume can gradually be determined and stored. The data structures are then designed such that they can manage a plurality of local perpendicularity deviations.

If the global perpendicularity deviation of the CMM has to be determined anew, e.g. after an air bearing exchange, then the local perpendicularity deviations also have to be determined anew.

Table 1 illustrates, with use of variant 2 presented above, on the basis of assumed differences in the perpendicularity deviations, the effect on the deviations FR, FT and FA (maximal permitted limit values $MPE_{FR}$, $MPE_{FT}$, $MPE_{FA}$). If the differences in the perpendicularity deviations are minimized by the method described, then the deviations FR, FT and FA are improved. Simulation values of differences in the perpendicularity deviations are indicated in table 1. The preceding delta symbol in each case indicates that the difference is involved. Table 1 applies to a CMM with the indicated perpendicularity deviations in angular seconds and a rotary table axis that has been determined by the single-sphere method.

TABLE 1

Effects of the differences in the perpendicularity deviations between the global measurement region and the partial measurement region on the deviations FR, FT, FA

| ΔxWz | ΔyWx | ΔyWz | FR | FT | FA |
|---|---|---|---|---|---|
| 0.2 | 0 | 0 | 0.4 | 0.4 | 0 |
| 0 | 0.2 | 0 | 0.2 | 0.2 | 0 |
| 0 | 0 | 0.2 | 0.4 | 0.4 | 0 |
| 0.2 | 0 | 0.2 | 0.56 | 0.56 | 0 |
| 0.2 | 0.2 | 0.2 | 0.58 | 0.60 | 0 |

Figure 5:
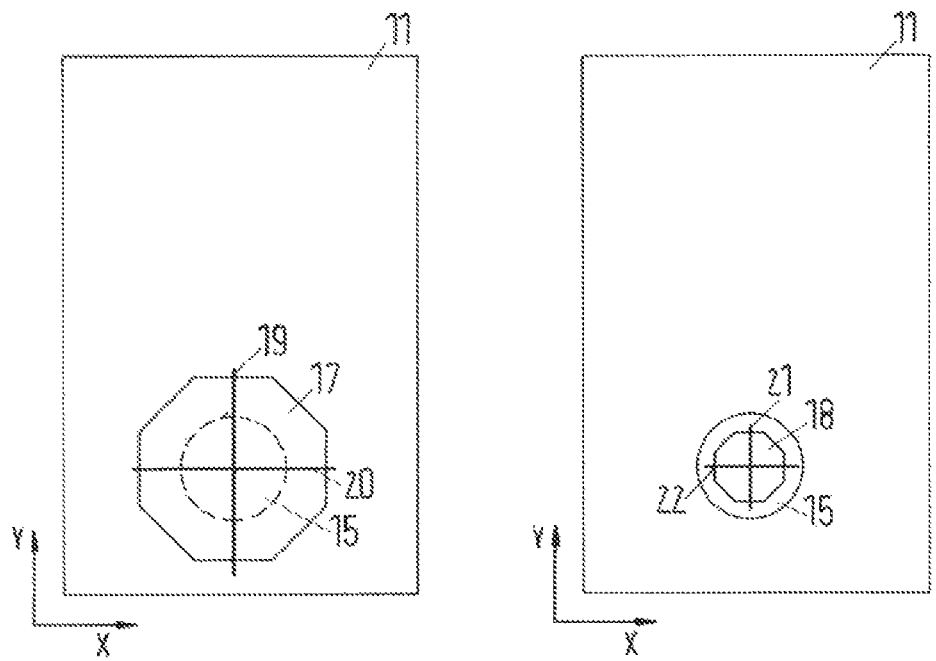
FIG. 5 shows a comparison of the determination of the perpendicularity deviation for a large/small workpiece.

A further optimization of the method is illustrated with reference to FIG. 5. The type and the apparatus for determining the perpendicularity deviation in the partial measurement region 15 above the rotary table 25 are adapted to the size of the workpiece. FIG. 5 illustrates one example for determining the perpendicularity deviation on a large workpiece 17 having a workpiece mass in comparison with a small workpiece 18 having a smaller workpiece mass in comparison therewith. The perpendicularity deviation is determined using a test object having a dimensioning the same as or similar to that of the workpieces 17 or respectively 18 to be measured on the rotary table, and/or having a mass the same as or similar to that of the workpieces to be measured on the rotary table. This optimization can be carried out as necessary by the user. For this purpose, the user can use one or a plurality of apparatuses 40 according to the construction illustrated in FIG. 4 with one or a plurality of sphere pairs A, B, wherein additional masses can be attached to the apparatus. Proposals in this respect are presented in table 2.

TABLE 2 position of the test spheres A, B on the apparatus 3D-alpha determination

| No. | Height difference ΔH [mm] | Radius R [mm] |
|---|---|---|
| 1 | 100 | 100 |
| 2 | 200 | 200 |
| 3 | 400 | 200 |
| 4 | 400 | 400 |
| 5 | 800 | 800 |
| ... | ... | ... |

The dimensions ΔH and R are in each case adapted to the size of the workpiece. Instead of a test object 40 having two spheres A, B as illustrated in FIG. 4, it is also possible to use gauge blocks 19, 20, 21, 22 for determining the perpendicularity deviation at the location of the rotary table, having lengths that are adapted to the dimensions of the workpieces 17, 18. In the case of high workpieces 17, 18 the gauge blocks 19, 20, 21, 22 are preferably aligned along the spatial diagonal through the workpiece. The gauge block 19 in FIG. 5 on the left can be positioned for example in a position as shown in FIG. 2 on the right, and so can the gauge block 21 in FIG. 5 on the left (in each case in the Y-Z-plane). The gauge blocks and workpieces are not positioned simultaneously, but rather successively, the gauge blocks for determining the perpendicularity deviation and the workpieces in measurement operation. The gauge blocks 19, 20 illustrated pictorially as different gauge blocks can be different positions of the same gauge block. The gauge blocks 21, 22 illustrated pictorially as different gauge blocks can likewise be different positions of the same gauge block.

Figure 6:
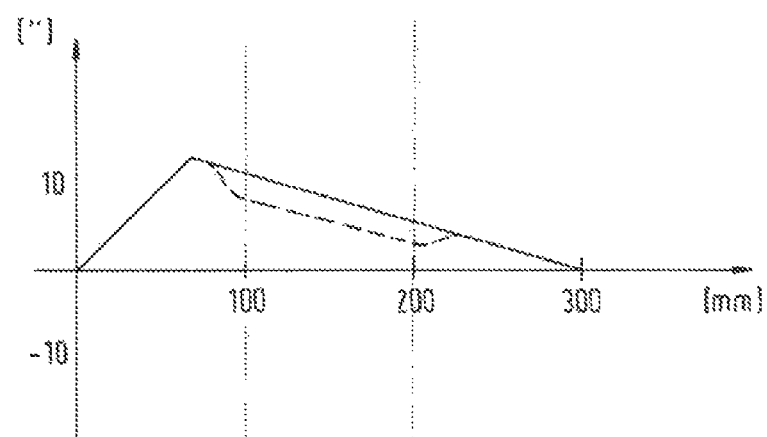
FIG. 6 shows an illustration of a correction line xRy with included offset as a result of a local perpendicularity deviation.
Figure 7:
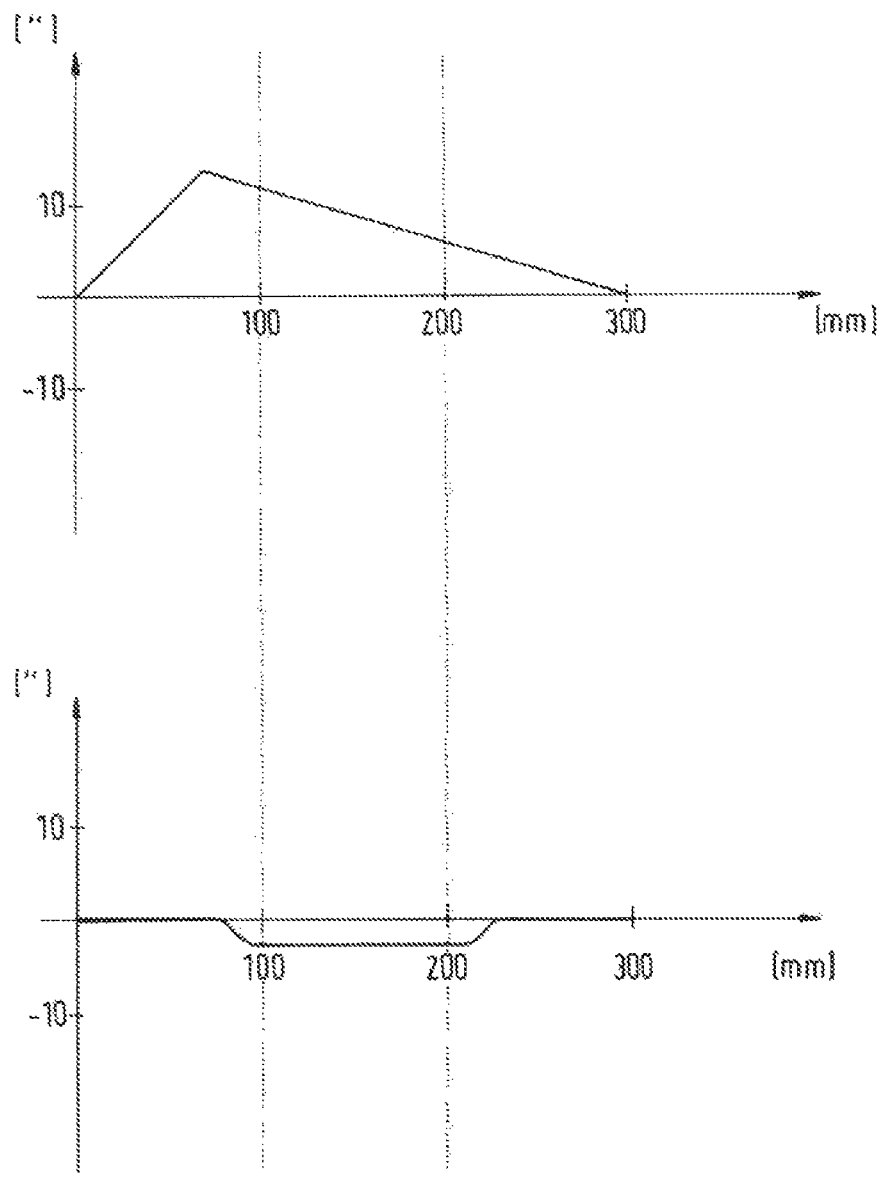
FIG. 7 shows individual illustrations of the correction line xRy and of a local perpendicularity deviation.

A further example is shown below, in which a local perpendicularity error is corrected:

Assumption for this specific example: the abscissa in FIG. 6-8 is intended to be the X-axis of the CMM, and the ordinate the Z-axis. The perpendicularity deviation between the Z-axis and the X-axis is intended to be corrected in this example.

Terms:

the perpendicularity error between the CMM Z-axis and X-axis is designated by xWz.

The rotational errors of the CMM X-axis are described by a CAA data file containing the correction values xRy for a multiplicity of X-positions. xRy describes the rotation of the X-axis about the Y-axis, for a multiplicity of X-positions. Linear interpolation, for example, is effected between the positions.

It holds true that:

A perpendicularity error xWz between the X-axis and the Z-axis has an effect as an offset in the case of the correction value xRy. If the CMM, when capturing the xRy error, has a constant perpendicularity error xWz between the X-axis and Z-axis, the entire correction line for xRy shifts upward or downward.

It follows from this that:

A local perpendicularity deviation xWz valid in a section of the X-axis can be described by local offset changes of the correction line xRy.

This can take place e.g. in a separate file. This file then initially contains rectangle functions distributed over the entire length of the X-axis. The position and length of the rectangle relative to the X-value indicate the validity range of the local perpendicularity deviation. The height of the rectangle function indicates the magnitude of the perpendicularity change. The offset values are added to the xRy value when the local correction file is active. Since the addition of rectangle functions generates jumps in the correction line, the transitions are preferably rounded in order to avoid discontinuities and to improve the position control of the CMM by means of the position controller.

The following advantages are afforded:

A plurality of local perpendicularity changes can be described in one file.

Switching between different CAA files is no longer necessary.

It is possible to work with or without local perpendicularity correction.

In this embodiment, the local perpendicularity correction is not added to a global perpendicularity correction xWz. As a result, the globally valid perpendicularity corrections remain cleanly separate from the local optimizations.

The monitoring of regions is obviated; error messages are avoided.

The data handling is facilitated.

The method functions analogously for the other perpendicularity errors:

yWz and yRx xWy and xRz

With different axis assignment in FIGS. 6-8, a local perpendicularity deviation xWy can be described by a local offset change of the correction line xRz, and a local perpendicularity deviation yWz can be described by a local offset change of the correction line yRx.

The above method will be concretely explained again with reference to FIGS. 6-8:

FIG. 6 illustrates the correction line for the rotational guidance error xRy along the travel axis X. The range from 100 mm to 200 mm identified between the vertical demarcations is intended to be optimized. A global perpendicularity deviation assumed as it were for the total measurement region is not taken into account, such that the correction line xRy contains no offsets over the entire region. A local perpendicularity deviation in the range from 100 to 200 mm along the travel axis of the CMM has an effect as a local offset, illustrated by the dashed line. The dashed line identifies the locally more correct perpendicularity error profile, but the latter is disregarded by the global perpendicularity error curve.

As a result of the simultaneous inclusion or computation of the deviation xRy and the local perpendicularity deviation in the range from 100 mm to 200 mm in one CAA file, changing between different CAA files is avoided.

FIG. 7, at the top, illustrates the correction line for the rotational guidance error xRy without an offset. FIG. 7, at the bottom, illustrates the local perpendicularity deviation in the range from 100-200. The bottom curve illustrates only the change in the offset and thus indirectly the perpendicularity change. Since the offset does not change outside the range to be locally corrected, it is zero there. However, it is also possible to take account of further perpendicularity deviations in other ranges, outside 100-200 mm. Further offsets, or—represented graphically—further rectangular steps, would be obtained in other ranges, the transitions therebetween preferably being rounded. The roundings result in smoother transitions of the correction line along the travel axis of the CMM, which can be better processed by the position controller of the CMM. However, a rounding of transitions is not necessary in every case. By way of example, if measurement is carried out only above a rotary table, the transitions need not be considered. In this case, the local perpendicularity deviations only in the region of the rotary table are taken into account, without a change at the transition from rotary table to a different measurement location being of significance (unlike in the case of measurement along a travel axis).

Combination of both lines, FIG. 7 at the top and bottom, yields the line in FIG. 6 together with offset between 100 and 200 mm.

FIG. 8 illustrates the effect of a global perpendicularity deviation on the correction line xRy. The global perpendicularity error has an effect as an offset on the correction line, as shown in FIG. 8, without a local perpendicularity deviation being taken into account.

The present invention makes it possible to describe the global perpendicularity deviation, one or a plurality of local perpendicularity deviations and further guidance deviations, such as e.g. xRy, in a correction line. For this purpose, the local perpendicularity deviation from FIG. 7, at the bottom, which would have an effect as an offset in the range from 100 to 200, can also be taken into account on the line in FIG. 8. However, it is preferred to take account of local perpendicularity deviations separately from global perpendicularity deviations, as shown in FIG. 7. As a result, the globally valid corrections remain cleanly separate from the local optimizations. Such a method is preferred over methods in which global and local perpendicularity deviations are taken into account simultaneously. An advantage arises principally in the data management/data handling.

In measurement operation, the CMM can operate with or without local perpendicularity optimizations.

FIG. 9a shows the correction of a location-dependent angular deviation, wherein steps S1a and S1b illustrate two subvariants that can be employed alternatively or cumulatively.

Step S1a involves determining values of the location-dependent angular deviation in such a way that in each case at least one determined value is obtained for at least two partial measurement regions 15, 20 (see FIG. 3) of the coordinate measuring machine 211 (see FIG. 10), which form only part of a total measurement region 30 (see FIG. 3) of the coordinate measuring machine, wherein values of the location-dependent angular deviation determined for different partial measurement regions 15, 20 of the coordinate measuring machine differ. The angular deviation is a perpendicularity deviation, in particular. The determination of the perpendicularity deviation in a total measurement region or a partial measurement region was explained with reference to FIGS. 1-3.

Step S1b involves the the determination of values of the location-dependent angular deviation in such a way that a determined value is obtained for at least one partial measurement region 15 (see FIG. 3) and at least one value of the angular deviation is determined for a total measurement region 30 (see FIG. 3) of the coordinate measuring machine 211, wherein the at least one determined value for a partial measurement region 15 of the coordinate measuring machine differs from the at least one value for the total measurement region 30. The determination of the perpendicularity deviation in a total measurement region or a partial measurement region was explained with reference to FIGS. 1-3.

Step S2 then involves, using the information from step S1a and/or step S1b, correcting the location-dependent angular deviation in one partial measurement region 15 or a plurality of partial measurement regions 15, 20 of the coordinate measuring machine 211 for which at least one determined value of the location-dependent angular deviation was obtained. The correction can be carried out by means of a correction device 221 mentioned in the general part of the description and illustrated in FIG. 10. The correction can be carried out in particular in measurement operation, during the measurement of the workpiece, for example during the measurement of a workpiece on a rotary table 25 (see FIG. 3), wherein the partial measurement region 15 is the measurement region above the rotary table 25.

FIG. 9b shows the correction of a temperature-dependent angular deviation. Step S1 involves the the determination of values of the temperature-dependent angular deviation for at least two different temperatures in such a way that determined values of the temperature-dependent angular deviation in a temperature range are obtained and/or information for correcting the temperature-dependent angular deviation in a temperature range is obtained. The determination of a perpendicularity deviation was explained with reference to FIGS. 1-3, different ambient temperatures being set in this method variant. Step S2 then involves, using the information from step S1, correcting the temperature-dependent angular deviation. The correction can be carried out by means of a correction device 221 mentioned in the general part of the description and illustrated in FIG. 10. The correction can be carried out in particular in measurement operation, during the measurement of a workpiece.

FIG. 9b also shows the correction of a loading mass-dependent angular deviation as an alternative to the correction of a temperature-dependent angular deviation. Step S1 of FIG. 9b involves determining values of the loading mass-dependent angular deviation in the case of the loading of the coordinate measuring machine with at least two different loading masses in such a way that determined values of the loading mass-dependent angular deviation in a range of loading masses are obtained and/or information for correcting the loading mass-dependent angular deviation in a temperature range is obtained. The determination of a perpendicularity deviation was explained with reference to FIGS. 1-3, wherein in this method variant, for example, different loading masses are applied to the base of the CMM or a rotary table. By way of example, a rotary table 25 (FIG. 3) is loaded with different workpieces 17, 18 (see FIG. 5) each having a different workpiece mass and the perpendicularity deviation is determined in each case. Step S2 then involves correcting the loading mass-dependent angular deviation using one of the determined values and/or the information obtained from step S1. Once again, the correction can be carried out by means of a correction device 221 mentioned in the general part of the description and illustrated in FIG. 10. The correction can be carried out in particular in measurement operation, during the measurement of a workpiece.

Figure 10:
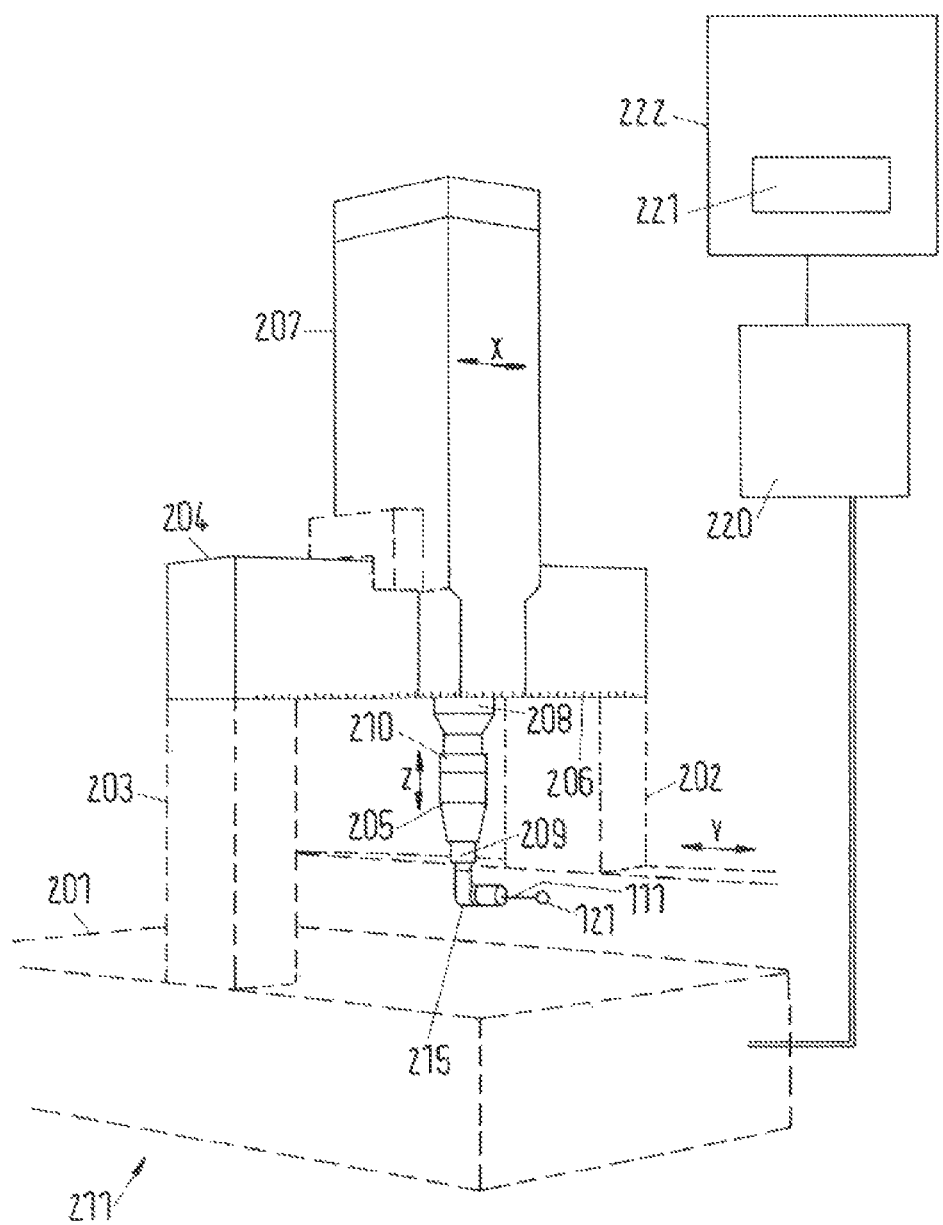
FIG. 10 shows a coordinate measuring machine according to the invention.

The coordinate measuring machine (CMM) 211 of gantry design as illustrated in FIG. 10 comprises a measuring table 201, above which columns 202, 203 are arranged movably in the Y-direction of a Cartesian coordinate system. The measuring table 201 corresponds to the measuring table 11 in FIG. 3, illustrated therein in a view from above. The columns 202, 203 together with a crossbar 204 form a gantry of the CMM 211. The crossbar 204 is connected to the columns 202 and 203 at its opposite ends. Electric motors (not illustrated in more specific detail) cause the linear movement of the columns 202, 203 in the Y-direction, along the Y-movement axis. In this case, e.g. each of the two columns 202, 203 is assigned an electric motor. The crossbar 204 is combined with a cross-slide 207, which, mounted by means of an air bearing system, is movable along the crossbar 204 in the X-direction of the Cartesian coordinate system. The instantaneous position of the cross-slide 207 relative to the crossbar 204 can be ascertained with the aid of a scale graduation 206. The movement of the crossbar 204 in the X-direction, i.e. along the X-movement axis, is driven by a further electric motor. A sleeve 208 is mounted on the cross-slide 207, said sleeve being movable in the vertical direction and being connected at its lower end to a coordinate measuring device 209 via a mounting device 210 and a rotation apparatus 205. The coordinate measuring device 209 has an angled probe head 215, on which a probe pin 111 with probe sphere 121 is arranged in a detachable manner. The coordinate measuring device 209, driven by a further electric motor, can be moved relative to the cross-side 207 in the Z-direction, along the Z-movement axis, of the Cartesian coordinate system. By means of the electric motors of the CMM, the probe head 209 can be moved into virtually any arbitrary positions in the region below the crossbar 204. Furthermore, the rotation apparatus 205 can rotate the probe head 215 about the Z-axis, such that the probe pin 111 can be aligned in different directions.

The illustration furthermore shows a controller 220 that controls the movement of the movable parts of the CMM along the movement axes. Furthermore, the coordinate measuring machine 211 comprises a correction device 221, which is configured to perform the correction of the angular deviation and, if appropriate, translational and/or rotational guidance deviations. The correction device 221 is part of a measurement computer 222, or the measurement computer 222 performs the task of the correction device. The measurement computer 222 is connected to the controller 220 for exchanging information, such as, for example, commands and status messages. The computer 222 or the controller 220 can have a memory (not illustrated in more specific detail) in which there is stored for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation, and/or for at least two temperatures in each case at least one value of an angular deviation, and/or information for correcting a temperature-dependent angular deviation, and/or for at least two loading masses in each case at least one value of an angular deviation, and/or information for correcting a loading mass-dependent angular deviation.

The correction device 221 accesses the memory for correction purposes.

Generally, and in a manner not restricted to the specific examples above, the invention discloses the following subjects, wherein reference is also made to the general part of the description for explanation purposes:

1. A method for correcting at least one angular deviation of a real angle from an ideal angle between movement axes (X, Y, Z) with a coordinate measuring machine (211), wherein the angular deviation is location-dependent and/or temperature-dependent and/or dependent on a loading mass, comprising the steps of a-1) determining values of the location-dependent angular deviation in such a way that i) in each case at least one determined value is obtained for at least two partial measurement regions (15, 20) of the coordinate measuring machine which form only part of a total measurement region (30) of the coordinate measuring machine, wherein values of the location-dependent angular deviation determined for different partial measurement regions of the coordinate measuring machine differ or can differ, and/or ii) at least one determined value is obtained for at least one partial measurement region (15) and at least one value of the angular deviation is determined for a total measurement region (30) of the coordinate measuring machine, wherein the at least one determined value for a partial measurement region of the coordinate measuring machine differs or can differ from the at least one value for the total measurement region, and b-1) correcting the location-dependent angular deviation in one or a plurality of partial measurement regions (15, 20) of the coordinate measuring machine for which at least one determined value of the location-dependent angular deviation was obtained, using the at least one determined value, and/or the steps of a-2) determining values of the temperature-dependent angular deviation for at least two different temperatures in such a way that determined values of the temperature-dependent angular deviation in a temperature range are obtained and/or information for correcting the temperature-dependent angular deviation in a temperature range is obtained, b-2) correcting the temperature-dependent angular deviation using one of the determined values and/or the obtained information from step a-2), and/or the steps of a-3) determining one value or a plurality of values of the loading mass-dependent angular deviation upon the loading of the coordinate measuring machine with one loading mass or with at least two different loading masses (17, 18) in such a way that a value for the loading mass-dependent angular deviation or determined values of the loading mass-dependent angular deviation in a range of loading masses is or are obtained and/or information for correcting the loading mass-dependent angular deviation is obtained, and b-3) correcting the loading mass-dependent angular deviation using one of the determined values and/or the obtained information from step a-3).

2. The method according to number 1, wherein at least one of the partial measurement regions (15, 20) is a continuous linear region, a continuous planar region or a continuous volume region.

3. The method according to number 1 or 2, wherein a translational guidance deviation of at least one travel axis of the CMM is additionally corrected.

4. The method according to any of the preceding numbers, wherein a rotational guidance deviation of at least one travel axis of the CMM is additionally corrected.

5. The method according to number 4, wherein a correction function for correcting the angular deviation and the rotational guidance deviation is formed, and values of the angular deviation in the at least one partial measurement region and values of the rotational guidance deviation are used for forming the correction function.

6. The method according to any of the preceding numbers, wherein the location-dependent angular deviation is governed by a loading mass which leads to the location-dependent angular deviation only in a partial measurement region, wherein the loading mass causes a force or a moment.

7. The method according to any of numbers 1-3 or 6, wherein the angular deviation in a partial measurement region together with a rotational guidance deviation of a real movement of parts of the coordinate measuring machine along a movement axis from an ideal movement of the parts of the coordinate measuring machine along the movement axis is taken into account by the formation of a correction function for correcting the angular deviation and the axis deviation, and values of the angular deviation in the at least one partial measurement region and values of the rotational guidance deviation are used for forming the correction function.

8. The method according to any of the preceding numbers, wherein, when correcting the location-dependent angular deviation in the at least one partial measurement region, a difference between the at least one value of the angular deviation for the total measurement region (30) and the at least one value of the angular deviation for the partial measurement region (15) is determined, and the difference is used when correcting the angular deviation.

9. The method according to any of numbers 1-7, wherein, when correcting the location-dependent angular deviation, the at least one value of the angular deviation for the total measurement region (30) is disregarded and the at least one value of the angular deviation in the at least one partial measurement region (15) is used when correcting the angular deviation.

10. The method according to any of the preceding numbers, wherein one of the partial measurement regions (15) in step a-1) i) or the partial measurement region in step a-1) ii) is the measurement region above a rotary table (25).

11. The method according to number 10, wherein the rotary table (25) is loaded with a workpiece mass (17, 18) and a correction of the location-dependent angular deviation and correction of the loading mass-dependent angular deviation are carried out.

12. The method according to any of the preceding numbers, wherein the partial measurement region (15) in which the at least one value of the angular deviation is determined has a dimensioning the same as or similar to that of a workpiece (17, 18) to be measured.

13. The method according to any of the preceding numbers, wherein determining the at least one value of the angular deviation is carried out with a test object (19, 20, 21, 22; 40) adapted to the size of the workpiece (17, 18) to be measured.

14. The method according to any of the preceding numbers, wherein determining the at least one value of the the angular deviation is carried out with a test object adapted to the mass and/or position and/or orientation of the workpiece (17, 18) to be measured.

15. The method according to any of the preceding numbers, wherein for at least two partial measurement regions (15, 20) of the coordinate measuring machine (211) in each case at least one value of an angular deviation, or for at least one partial measurement region (15) of the coordinate measuring machine and a total measurement region (30) of the coordinate measuring machine in each case at least one value of an angular deviation, and/or for at least two temperatures in each case at least one value of an angular deviation, and/or information for correcting a temperature-dependent angular deviation, and/or for at least two loading masses (17, 18) in each case at least one value of an angular deviation, and/or information for correcting a loading mass-dependent angular deviation is/are stored in the coordinate measuring machine and the at least one value and/or the information for the relevant partial measurement region or total measurement region and/or for the relevant temperature and/or for the relevant loading mass is/are used, in particular is/are used automatically, in the correction.

16. The method according to any of the preceding numbers, wherein
    the point in time of the determination of the values or of the information is assigned to the values of the angular deviation or the information for correcting the angular deviation,
    a time period from the point in time of the determination until the point in time of the correction of the angular deviation is determined,
    a guideline value is assigned to the time period, wherein the guideline value contains information about the reliability and/or validity of the values of the angular deviation or the validity of the information for correcting the angular deviation.
17. A coordinate measuring machine (211) designed for carrying out a method according to any of numbers 1-16.
18. The coordinate measuring machine (211) according to number 17, comprising a correction device (221) configured to carry out the correction of an angular deviation.
19. The coordinate measuring machine according to number 17 or 18, wherein the correction device (221) is configured,
    in the case of coordinate measurement in a total measurement region (30) of the coordinate measuring machine, to correct an angular deviation using at least one value of the angular deviation in the total measurement region (30) and, in the case of coordinate measurement in a partial measurement region (15, 20) of the coordinate measuring machine, to correct an angular deviation using at least one value of the angular deviation in the partial measurement region (15, 20), and/or
    in the case of coordinate measurement in a first partial measurement region (15) of the coordinate measuring machine, to correct an angular deviation using at least one value of the angular deviation in the first partial measurement region (15) and, in the case of coordinate measurement in a second partial measurement region (20) of the coordinate measuring machine, to correct an angular deviation using at least one value of the angular deviation in the second partial measurement region (20), and/or
    in the case of coordinate measurement at a first measurement temperature, to correct an angular deviation using at least one value of the angular deviation at the first measurement temperature, and in the case of coordinate measurement at a second measurement temperature, to correct an angular deviation using at least one value of the angular deviation at the second measurement temperature, and/or
    in the case of coordinate measurement in the case of loading with a first mass (17), to correct an angular deviation using at least one value of the angular deviation in the case of the loading with the first mass (17), and in the case of coordinate measurement in the case of loading with a second mass (18), to correct an angular deviation using at least one value of the angular deviation in the case of the loading with the second mass (18).
20. The coordinate measuring machine (211) according to any of numbers 17-19, comprising a memory in which the following information is stored:
    for at least two partial measurement regions (15, 20) of the coordinate measuring machine (211) in each case at least one value of an angular deviation, or for at least one partial measurement region (15) of the coordinate measuring machine and a total measurement region (30) of the coordinate measuring machine in each case at least one value of an angular deviation, and/or
    for at least two temperatures in each case at least one value of an angular deviation, and/or information for correcting a temperature-dependent angular deviation,
    for at least two loading masses (17, 18) in each case at least one value of an angular deviation, and/or information for correcting a loading mass-dependent angular deviation.

The invention claimed is:
1. A method for improving accuracy in measuring coordinates of a workpiece in a coordinate measuring machine, the method comprising correcting an angular deviation of a real angle from an ideal angle between movement axes of the coordinate measuring machine, wherein the angular deviation is dependent on a location, the method comprising the following steps:
    a-1) determining values of a location-dependent angular deviation by carrying out one or both of the following:
        i) in each case determining at least one value for at least two partial measurement regions of the coordinate measuring machine which form only part of a total measurement region of the coordinate measuring machine, wherein values of the location-dependent angular deviation determined for different partial measurement regions of the coordinate measuring machine differ or may differ; and/or
        ii) determining at least one value for at least one partial measurement region and determining at least one value of the angular deviation for a total measurement region of the coordinate measuring machine, wherein the at least one determined value for a partial measurement region of the coordinate measuring machine differs or may differ from the at least one value for the total measurement region,
    a-1a) measuring coordinates of the workpiece with a measuring head or sensor of the coordinate measuring machine, the coordinate measuring machine including a controller configured to determine or to receive notification from a computer whether a measurement region lies in one of the partial measurement regions for which at least one value of the angular deviation was determined, the method further including determining, by the controller, whether a current position of the measuring head or sensor is situated in the one of the partial measurement regions;
    b-1) correcting the location-dependent angular deviation in the one of the partial measurement regions of the coordinate measuring machine for which at least one value of the location-dependent angular deviation was determined, using the at least one determined value from step a-1), the correction being done by the controller and/or the computer during or after the movement of the measuring head or sensor, with values of the positions of the measuring head or sensor being corrected depending on the location;
    b-1a) obtaining corrected measurement results from the coordinate measurement of the workpiece.
2. The method of claim 1, wherein the angular deviation is further dependent on at least one of a temperature or a loading mass, the method further comprising the steps of:
    a-2) determining values of a temperature-dependent angular deviation for at least two different temperatures by determining values of the temperature-dependent angular deviation in a temperature range and/or obtaining information for correcting the temperature-dependent angular deviation in a temperature range;

a-2a) measuring coordinates of the workpiece with a measuring head or sensor of the coordinate measuring machine, and determining the temperature;

b-2) correcting the temperature-dependent angular deviation using one of the determined values and/or the obtained information from step a-2) with the controller and/or the computer during or after the movement of the measuring head or sensor, with values of the positions of the measuring head or sensor being corrected depending on the temperature;

and/or the steps of:

a-3) determining one value or a plurality of values of a loading mass-dependent angular deviation upon the loading of the coordinate measuring machine with one loading mass or with at least two different loading masses by determining a value for the loading mass-dependent angular deviation or values of the loading mass-dependent angular deviation in a range of loading masses and/or obtaining information for correcting the loading mass-dependent angular deviation;

a-3a) measuring coordinates of the workpiece with a measuring head or sensor of the coordinate measuring machine and determining the loading mass;

b-3) correcting the loading mass-dependent angular deviation using one of the determined values and/or the obtained information from step a-3) with the controller and/or the computer during or after the movement of the measuring head or sensor, with values of the positions of the measuring head or sensor being corrected depending on the loading mass.

3. The method according to claim 1, wherein at least one of the partial measurement regions is a continuous linear region, a continuous planar region or a continuous volume region.

4. The method according to claim 1, which comprises:
taking into account the angular deviation in a partial measurement region together with a rotational guidance deviation of a real movement of parts of the coordinate measuring machine along a movement axis from an ideal movement of the parts of the coordinate measuring machine along the movement axis by forming a correction function for correcting the angular deviation and the axis deviation; and using values of the angular deviation in the at least one partial measurement region and values of the rotational guidance deviation for forming the correction function.

5. The method according to claim 1, wherein the step of correcting the location-dependent angular deviation in the at least one partial measurement region comprises determining a difference between the at least one value of the angular deviation for the total measurement region and the at least one value of the angular deviation for the partial measurement region, and using the difference when correcting the angular deviation.

6. The method according to claim 1, wherein the step of correcting the location-dependent angular deviation comprises disregarding the at least one value of the angular deviation for the total measurement region and using the at least one value of the angular deviation in the at least one partial measurement region when correcting the angular deviation.

7. The method according to claim 1, wherein the coordinate measuring machine has a rotary table and one of the partial measurement regions in step a-1) i) or the partial measurement region in step a-1) ii) is the measurement region above the rotary table.

8. The method according to claim 7, which comprises loading the rotary table with a workpiece mass and carrying out a correction of the location-dependent angular deviation and a correction of the loading mass-dependent angular deviation.

9. The method according to claim 1, which comprises defining the partial measurement region in which the at least one value of the angular deviation is determined with dimensions equal or similar to dimensions of a workpiece to be measured.

10. The method according to claim 1, which comprises carrying out the step of determining the at least one value of the angular deviation with a test object adapted to a size of the workpiece to be measured.

11. The method according to claim 1, which comprises carrying out the step of determining the at least one value of the angular deviation with a test object adapted to a mass and/or a position and/or an orientation of a workpiece to be measured.

12. The method according to claim 1, which comprises storing in the coordinate measuring machine the following:

for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation; and using the at least one value and/or the information for the relevant partial measurement region or total measurement region in the correction.

13. The method according to claim 12, which comprises automatically using the at least one value and/or the information for the relevant partial measurement region or total measurement region in the correction.

14. The method according to claim 2, which comprises storing in the coordinate measuring machine one or more of the following:

for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation;

for at least two temperatures in each case at least one value of an angular deviation, and/or information for correcting a temperature-dependent angular deviation;

for at least two loading masses in each case at least one value of an angular deviation, and/or information for correcting a loading mass-dependent angular deviation; and using the at least one value and/or the information for the relevant partial measurement region or total measurement region and/or for the relevant temperature and/or for the relevant loading mass in the correction.

15. The method according to claim 14, which comprises automatically using the at least one value and/or the information for the relevant partial measurement region or total measurement region and/or for the relevant temperature and/or for the relevant loading mass in the correction.

16. The method according to claim 1, which comprises:

associating a point in time of the determination of the values or of the information to the values of the angular deviation or the information for correcting the angular deviation;

determining a time period from the point in time of the determination until the point in time of the correction of the angular deviation;

assigning a guideline value to the time period, the guideline value containing information about a reliability and/or validity of the values of the angular deviation or the validity of the information for correcting the angular deviation.

17. A coordinate measuring machine, comprising a measuring head or sensor and a computer and/or controller configured to correct an angular deviation by carrying out the method according to claim 1.

18. The coordinate measuring machine according to claim 17, wherein said computer and/or controller is configured to perform one or more of the following processes:

in the case of coordinate measurement in a total measurement region of the coordinate measuring machine, to correct an angular deviation using at least one value of the angular deviation in the total measurement region and, in the case of coordinate measurement in a partial measurement region of the coordinate measuring machine, to correct an angular deviation using at least one value of the angular deviation in the partial measurement region;

in the case of coordinate measurement in a first partial measurement region of the coordinate measuring machine, to correct an angular deviation using at least one value of the angular deviation in the first partial measurement region and, in the case of coordinate measurement in a second partial measurement region of the coordinate measuring machine, to correct an angular deviation using at least one value of the angular deviation in the second partial measurement region.

19. The coordinate measuring machine according to claim 17, further comprising a memory having the following information stored thereon:

for at least two partial measurement regions of the coordinate measuring machine in each case at least one value of an angular deviation, or for at least one partial measurement region of the coordinate measuring machine and a total measurement region of the coordinate measuring machine in each case at least one value of an angular deviation.

20. A coordinate measuring machine, comprising a computer and/or controller configured to correct an angular deviation by carrying out the method according to claim 2, the computer and/or controller being configured to further perform one or more of the following processes:

in the case of coordinate measurement at a first measurement temperature, to correct an angular deviation using at least one value of the angular deviation at the first measurement temperature, and in the case of coordinate measurement at a second measurement temperature, to correct an angular deviation using at least one value of the angular deviation at the second measurement temperature; and in the case of coordinate measurement in the case of loading with a first mass, to correct an angular deviation using at least one value of the angular deviation in the case of the loading with the first mass, and in the case of coordinate measurement in the case of loading with a second mass, to correct an angular deviation using at least one value of the angular deviation in the case of the loading with the second mass.

21. The coordinate measuring machine according to claim 20, further comprising a memory having the following information stored thereon:

for at least two temperatures in each case at least one value of an angular deviation, and/or information for correcting a temperature-dependent angular deviation; and/or for at least two loading masses in each case at least one value of an angular deviation, and/or information for correcting a loading mass-dependent angular deviation.

22. The method of claim 1, wherein the controller automatically takes account of the angular deviation of the partial measurement regions if measurement is carried out in said one of the partial measurement regions.

23. The method of claim 22, wherein the controller is designed such that a local angular deviation automatically is disregarded or remains deactivated as long as a measurement is not carried out in said one of the partial measurement regions.

24. The method of claim 1, wherein the controller is activated if the measurement is carried out in the partial measurement region in order to do the correction.

* * * * *